United States Patent
Wang et al.

(10) Patent No.: US 11,570,038 B2
(45) Date of Patent: Jan. 31, 2023

(54) NETWORK SYSTEM FAULT RESOLUTION VIA A MACHINE LEARNING MODEL

(71) Applicant: Juniper Networks, Inc., Sunnyvale, CA (US)

(72) Inventors: Jisheng Wang, Palo Alto, CA (US); Xiaoying Wu, Sunnyvale, CA (US); Shmuel Shaffer, Palo Alto, CA (US); David Jea, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 132 days.

(21) Appl. No.: 16/835,757

(22) Filed: Mar. 31, 2020

(65) Prior Publication Data

US 2021/0306201 A1 Sep. 30, 2021

(51) Int. Cl.
*H04L 41/0631* (2022.01)
*G06N 20/00* (2019.01)
(Continued)

(52) U.S. Cl.
CPC ........ *H04L 41/064* (2013.01); *G05B 23/0281* (2013.01); *G05B 23/0289* (2013.01); *G05B 23/0294* (2013.01); *G06F 11/079* (2013.01); *G06F 11/0754* (2013.01); *G06F 11/0793* (2013.01); *G06F 16/2228* (2019.01); *G06N 7/005* (2013.01); *G06N 20/00* (2019.01); *G05B 2219/24198* (2013.01); *G05B 2219/24199* (2013.01); *G05B 2219/24204* (2013.01)

(58) Field of Classification Search
CPC ............ G05B 23/0281; G05B 23/0289; G05B 23/0294; G06F 11/0754; G06F 11/079; G06F 11/0793; G06F 16/2228; G06N 7/005; G06N 20/00; H04L 41/0064
See application file for complete search history.

(56) References Cited

U.S. PATENT DOCUMENTS

| | | | |
|---|---|---|---|
| 5,737,739 | A | 4/1998 | Shirley et al. |
| 7,536,595 | B1 | 5/2009 | Hiltunen et al. |

(Continued)

FOREIGN PATENT DOCUMENTS

| | | | |
|---|---|---|---|
| CN | 111585781 | A | 8/2020 |
| EP | 3407541 | A1 | 11/2018 |

(Continued)

OTHER PUBLICATIONS

"European Application Serial No. 20183026.2, Extended European Search Report dated Dec. 1, 2020", 11 pgs.

(Continued)

*Primary Examiner* — Thomas J Dailey
(74) *Attorney, Agent, or Firm* — Shumaker & Sieffert, P.A.

(57) ABSTRACT

Disclosed are embodiments for automatically resolving faults in a complex network system. Some embodiments monitor one or more of system operational parameter values and message exchanges between network components. A machine learning model detects a fault in the complex network system, and an action is selected based on a cause of the fault. After the action is applied to the complex network system, additional monitoring is performed to either determine the fault has been resolved or additional actions are to be applied to further resolve the fault.

20 Claims, 20 Drawing Sheets

(51) Int. Cl.
  *G06F 16/22*   (2019.01)
  *G06N 7/00*    (2006.01)
  *G06F 11/07*   (2006.01)
  *G05B 23/02*   (2006.01)

(56) References Cited

U.S. PATENT DOCUMENTS

| | | | |
|---|---|---|---|
| 8,073,806 B2* | 12/2011 | Garg | H04L 12/66 |
| | | | 706/62 |
| 9,832,082 B2 | 11/2017 | Dade et al. | |
| 10,270,644 B1 | 4/2019 | Valsecchi et al. | |
| 10,470,077 B1 | 11/2019 | Kodaypak et al. | |
| 10,862,742 B2 | 12/2020 | Singh | |
| 10,958,537 B2 | 3/2021 | Safavi | |
| 10,958,543 B2 | 3/2021 | Dade et al. | |
| 10,958,585 B2 | 3/2021 | Safavi | |
| 10,985,969 B2 | 4/2021 | Safavi | |
| 11,099,928 B1* | 8/2021 | Vah | G06F 11/0793 |
| 2001/0011260 A1 | 8/2001 | Skaanning et al. | |
| 2007/0066297 A1 | 3/2007 | Heidari-Bateni | |
| 2007/0260911 A1 | 11/2007 | Marilly et al. | |
| 2010/0091676 A1 | 4/2010 | Moran et al. | |
| 2011/0231704 A1 | 9/2011 | Ge et al. | |
| 2014/0172371 A1 | 6/2014 | Zhu et al. | |
| 2014/0269269 A1 | 9/2014 | Kovvali et al. | |
| 2014/0355454 A1 | 12/2014 | Serban et al. | |
| 2016/0162346 A1 | 6/2016 | Kushir et al. | |
| 2016/0226740 A1 | 8/2016 | Van Oost et al. | |
| 2016/0286409 A1 | 9/2016 | Kravets et al. | |
| 2017/0019291 A1 | 1/2017 | Tapia et al. | |
| 2017/0126445 A1 | 5/2017 | Hamouda et al. | |
| 2017/0364819 A1 | 12/2017 | Yang | |
| 2017/0366993 A1 | 12/2017 | Bejerano et al. | |
| 2018/0048427 A1 | 2/2018 | Ganjam et al. | |
| 2018/0048527 A1 | 2/2018 | Ganjam et al. | |
| 2019/0163594 A1* | 5/2019 | Hayden | G06F 11/2257 |
| 2019/0347148 A1* | 11/2019 | Gomes Pereira | G06F 11/079 |
| 2019/0356553 A1 | 11/2019 | Mermoud et al. | |
| 2019/0373007 A1 | 12/2019 | Salunke et al. | |
| 2020/0022016 A1 | 1/2020 | Fenoglio et al. | |
| 2020/0267047 A1 | 8/2020 | Safavi | |
| 2021/0012115 A1* | 1/2021 | Bodbyl | G06K 9/00637 |
| 2021/0044477 A1 | 2/2021 | Singh | |
| 2021/0089927 A9 | 3/2021 | Ryan et al. | |
| 2021/0133594 A1* | 5/2021 | Dinh | G06N 20/00 |
| 2021/0168084 A1 | 6/2021 | Safavi | |
| 2021/0176143 A1 | 6/2021 | Dade et al. | |
| 2021/0226855 A1 | 7/2021 | Safavi | |
| 2021/0273845 A1 | 9/2021 | Safavi | |
| 2021/0306201 A1* | 9/2021 | Wang | G06F 11/0793 |
| 2021/0374567 A1* | 12/2021 | Bhimireddy | G06F 11/004 |

FOREIGN PATENT DOCUMENTS

| | | |
|---|---|---|
| JP | 2009509412 A | 3/2009 |
| JP | 2011028339 A | 2/2011 |
| JP | 2017509169 A | 3/2014 |
| JP | 2018506245 A | 3/2018 |
| JP | 2018514103 A | 5/2018 |
| JP | 2019536397 A | 12/2019 |
| JP | 2020137126 A | 8/2020 |
| WO | 2016107982 A1 | 7/2016 |
| WO | 2018093916 A1 | 5/2018 |
| WO | 2020150564 A1 | 7/2020 |

OTHER PUBLICATIONS

Response to Extended Search Report dated Dec. 1, 2020, from counterpart European Application No. 20183026.2 filed Apr. 6, 2022, 25 pp.

"Betweenness centrality," Wikipedia, The Free Encyclopedia, last edited on Apr. 18, 2021, Retrieved from: https://web.archive.org/web/20210418161442/https://en.wikipedia.org/wiki/Betweenness_centrality, accessed Nov. 19, 2021, 7 pp.

Gencaga, D, et al., "Survey on the Estimation of Mutual Information Methods as a Measure of Dependency Versus Correlation Analysis", AIP Conference Proceedings 1636, 80, (Jan. 2014), 10 pgs.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Mist, "Solution Brief; Mist Platform Enabling the AI-Drive Enterprise", Cupertino, CA, USA, Jul. 21, 2020, pp. 1-4, XP055870404, URL: https://www.juniper.net/content/dam/www/assets/solution-briefs/us/en/enabling-the-ai-driven-enterprise.pdf.

Safavi, "Bayesian Inference: a Key Building Block of AN AI Foundation," The New Stack, Retrieved May 21, 2021 from: https://thenewstack.io/bayesian-inference-a-key-building-block-of-an-ai-foundation/, Jul. 9, 2018, 15 pp.

Safavi, "Building Blocks for AI: Mutual Information and the Pearson Correlation," The New Stack, Retrieved May 21, 2021 from: https://thenewstack.io/mutual-information-pearson-correlationbuilding-blocks-ai/, Mar. 23, 2018, 15 pp.

U.S. Appl. No. 17/303,222, filed May 24, 2021, naming inventor Safavi.

U.S. Appl. No. 17/402,215, filed Aug. 13, 2021, naming inventors Wang.

U.S. Appl. No. 17/447,921, filed Sep. 16, 2021, naming inventors Zohoorian et al.

* cited by examiner

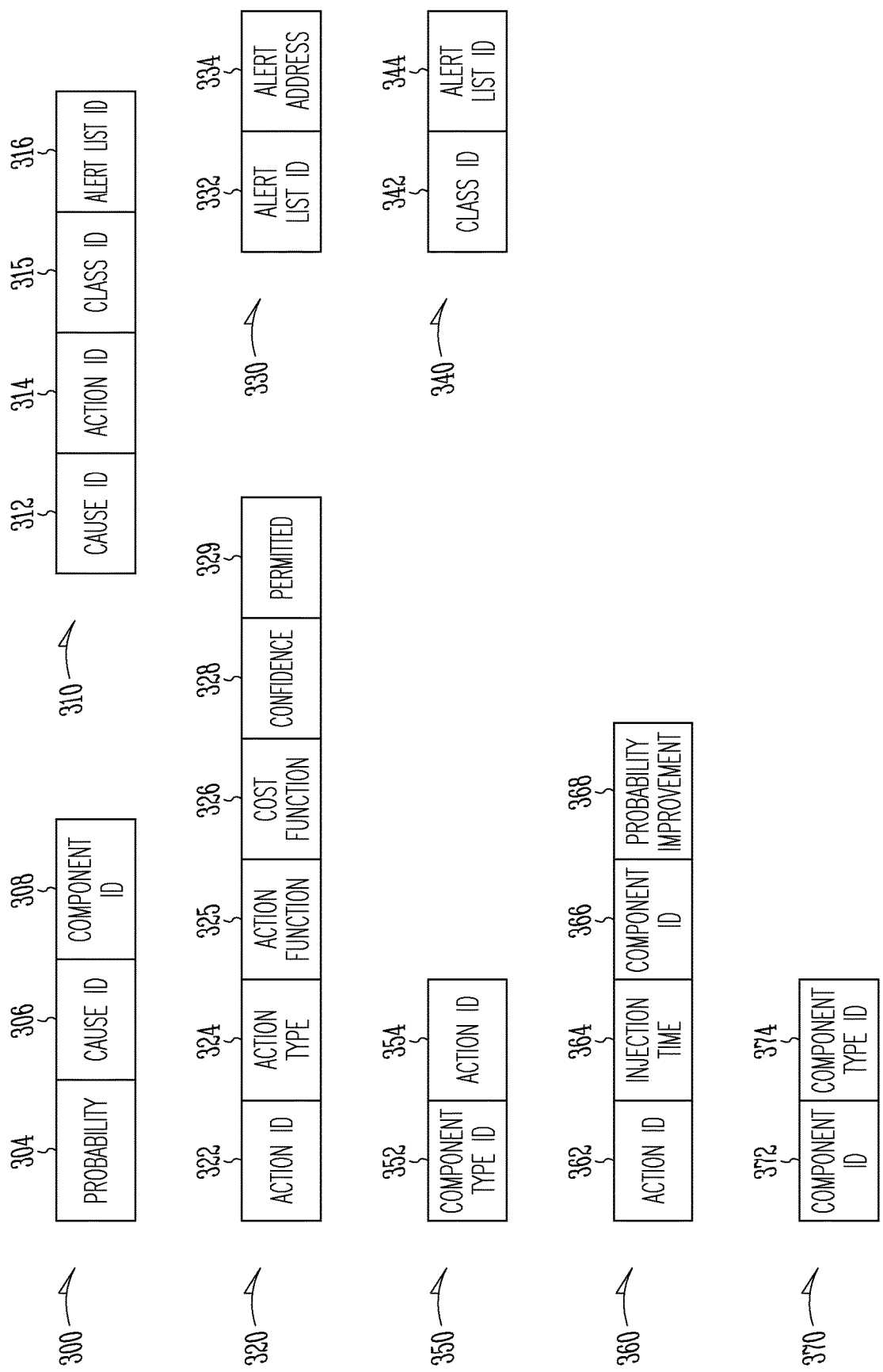

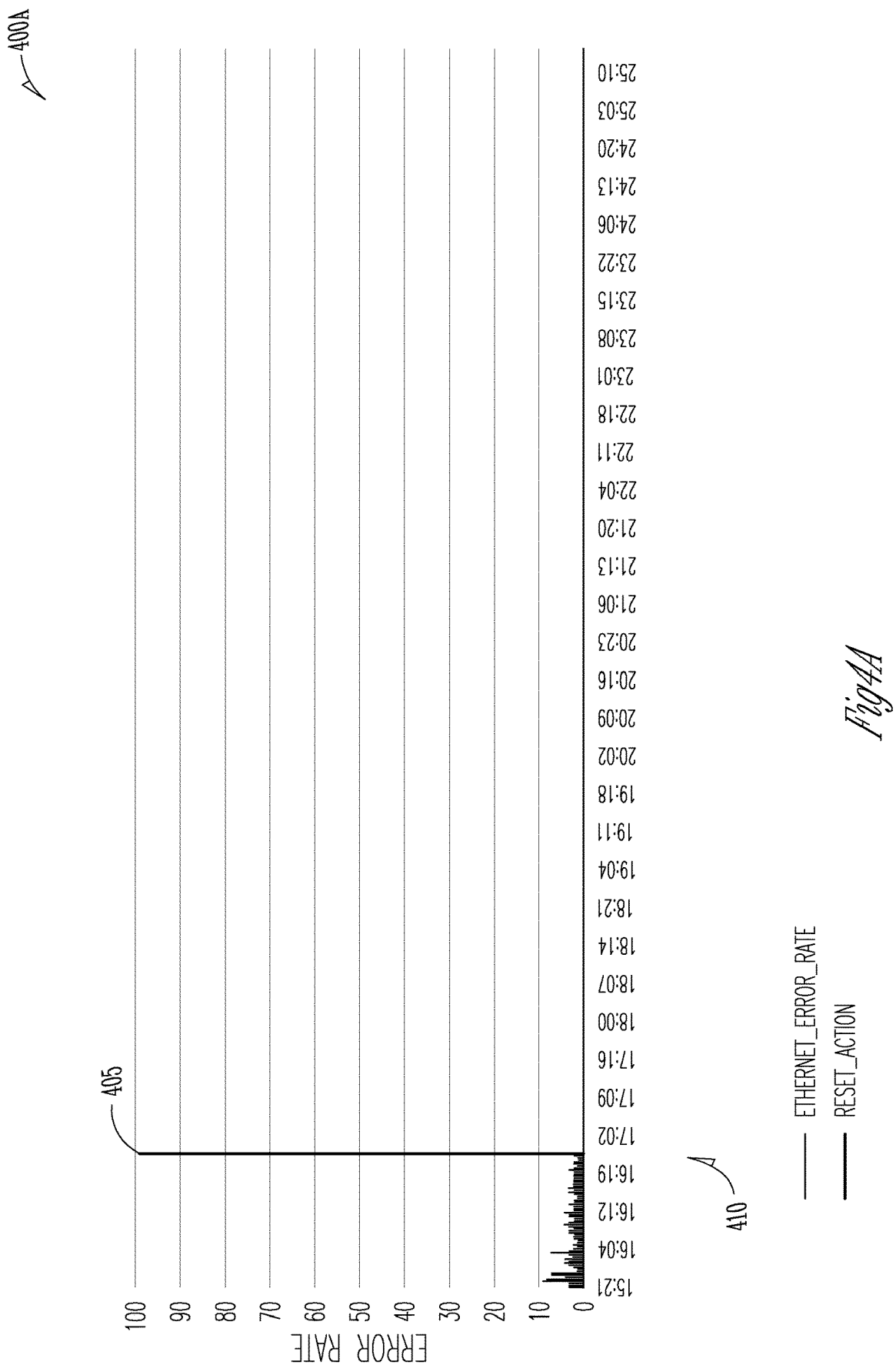

NETWORK SYSTEM FAULT RESOLUTION VIA A MACHINE LEARNING MODEL

FIELD

This disclosure generally relates to diagnostics of network systems. In particular, the disclosed embodiments describe use of a machine learning model to automatically resolve faults in the network system.

BACKGROUND

Users of complex wireless networks, such as Wi-Fi networks, may encounter degradation of system level experience (SLE) parameters which can result from a variety of complex factors. To ensure the complex wireless network meets the needs of its user community, it is important to quickly resolve any problems that can arise with the systems operation. Resolving the problems can include identifying one or more root causes of the system level experience problem, and to initiate corrective measures. However, when the network is comprised of a large number of devices, including devices of varying type and functionality, identifying a root cause can take a substantial amount of time. If the system is inoperative or operating in a reduced capacity during this period of time, users of the system can be impacted, in some cases severely. Thus, improved methods of isolating root causes of problems associated with complex network systems are needed.

BRIEF DESCRIPTION OF THE FIGURES

The embodiments herein may be better understood by referring to the following description in conjunction with the accompanying drawings in which like reference numerals indicate identically or functionally similar elements. These drawings include the following:

FIG. 3 shows example data structures that are maintained by one or more of the disclosed embodiments.

FIG. 4A shows an example of an action that rectifies an underlying root cause.

DETAILED DESCRIPTION

Figure 1:
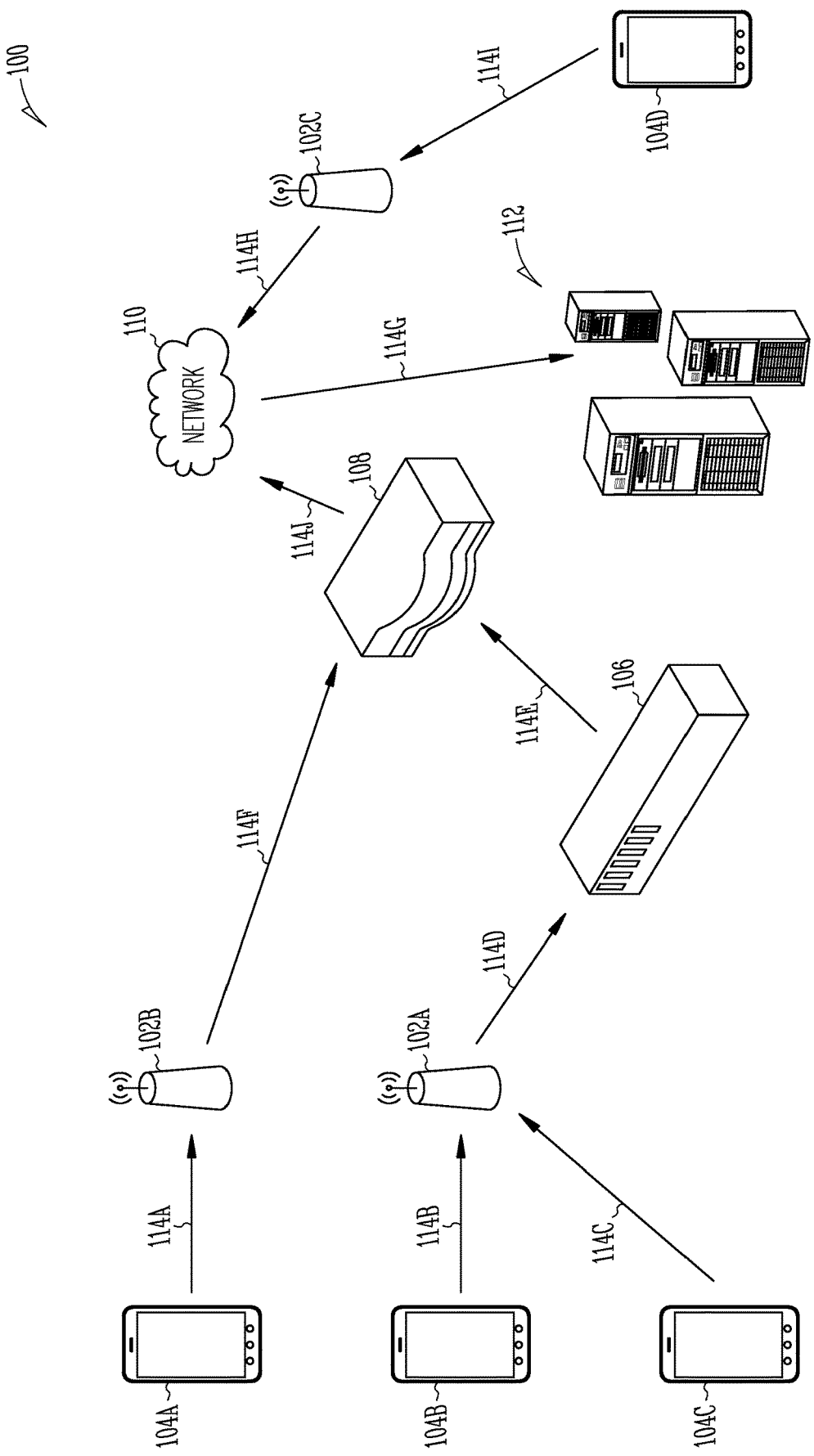
FIG. 1 is an overview diagram of an example system that is implemented in one or more of the disclosed embodiments.

Disclosed are example embodiments that determine and perform corrective actions to a complex network system (e.g. a wireless network system) to improve system performance. Performance of the complex system is assessed based on service level experience parameters, or more generally, operational parameters. These can include parameters such as data transmission latency measurements, percentage of connection attempts that are successful, percentage of access points (APs) that are available for association, error statistics, such as errors generated via dropped connections, packet collisions, or other sources of error, system throughput measurements, or other SLE parameters.

Some embodiments also monitor messages exchanged within the complex network system. This message information is also provided to a machine learning model, which is trained to identify faults and potential root causes of said faults. A fault can include, in various embodiments, any deviation from nominal system operation which the machine learning model is trained to detect. For example, a fault includes, in some embodiments, any one or more of a latency, throughput, jitter, error count, or other operational parameter meeting a criterion. The criterion is defined so as to detect an undesirable system condition. For example, an example criterion evaluates a latency of a device, such as an access point, to determine if the latency is below a predetermined latency threshold. In some embodiments, a fault can be defined to include two or more operational parameters meeting one or more respective criterion. For example, in some embodiments, a fault can be defined to include a latency of a device meeting a first criterion and a throughput of the device meeting a second criterion (both conditions satisfied contemporaneously, in which the latency and throughput are measured within a predetermined elapsed time of each other). A root cause of a fault relates to a condition that is causing the fault. For example, root causes can include a software and/or firmware problem with a particular device, an inoperative network connection between two devices, or other root causes.

Along with root cause identification, the disclosed embodiments identify possible actions to take to either resolve the system problem or obtain additional diagnostic information which can then be applied to increase confidence of a root cause identification. These actions include one or more of initializing a specific beacon radio, restarting a radio, rebooting a device, restarting a software component, restarting a computer, changing operating parameters of a software or hardware component, querying a system component for status information, requesting a system component to perform a task, or other actions.

Each of these actions is associated with a probability, indicating a probability that the action will resolve the problem. The actions are also associated with a cost. For example, a first action resulting in closing a large number of user sessions would typically have a higher cost than a second action that is transparent to the user community.

The disclosed embodiments then select a course of action based on the identified probabilities and associated costs. Some of the disclosed embodiments operate in an iterative manner, in that a first action is applied to the system, and then the system is monitored to collect additional data. For example, if the first action is designed to resolve the problem, the disclosed embodiments monitor the system to determine if the problem is resolved (e.g. the monitored system has returned to nominal operation). If the first action is designed to provide additional diagnostic information, the system is monitored subsequent to application of the second action to collect the additional diagnostic information. In some cases, additional actions are identified based on the system behavior after application of the first action. This process can iterate until the system achieves nominal performance, at which time the diagnostic process is considered complete.

Some embodiments utilize a cost function as defined below in Equation 1:

$$\text{Cost}_{Action\ i} = c1 * (\text{number of affected users}) * (\text{Impact}_{Action\ i}) \quad \text{Equ. 1}$$

where:
  $\text{Cost}_{Action\ i}$—cost of injection of a specific action
  C1—predetermined coefficient
  $\text{Impact}_{Action\ i}$—action specific parameter, for example:
    0.1 for initializing radio beacon,
    0.2 for resetting a radio,
    0.3 for rebooting a device, and
    0.4 for power resetting a device.

Some embodiments provide a user interface that is configured to accept input defining a root cause of a particular issue. For example, in some cases, a human (e.g. IT technical) diagnoses a system problem and identifies a root cause. The user interface is configured to allow the human to identify a time period during which the problem occurred, and also to enter information regarding the root cause and corrective actions. The user interface also provides an ability, in some aspects, for the operator to associate a distribution list or alert list with the identified root cause and/or corrective actions. Based on the input provided by the user interface, training data is generated that indicates the symptomatic, diagnostic, and corrective information.

In some embodiments, a machine learning model is at least partially trained via assistance from human support staff. In this mode of operation, a technician, e.g., a field support engineer, can analyze a fault with a network system and identify a root cause. The technician is then able to enter information defining the fault and the root cause, and possible actions to take in response to the fault into a training database. This training database is then used to further train the machine learning model, which benefits from the input provided by the technician.

Some embodiments are configured to automate defect reporting. For example, some embodiments interface with a defect reporting system (e.g. Jira) via a service-oriented interface or other API made available by a provider of the defect reporting system. Some embodiments perform an automatic searching of the defect reporting system for an existing defect that defines parameters similar to those identified during automated diagnostics as described above. If a similar defect report is identified, some embodiments update the report to indicate an additional incidence of the defect based on the recent diagnosis. If no similar defect is identified within the defect database, a new defect report is generated. The new defect report is populated with information from the measured operational parameters as well as information derived from the diagnostic process as described above.

FIG. 1 is an overview diagram of an example system that is implemented in one or more of the disclosed embodiments. FIG. 1 shows three APs 102*a-c* in communication with wireless terminals 104*a*, 104*b*, 104*c*, and 104*d*. AP 102*a* is in communication with a switch 106. The AP 102*b* and switch 106 are in communication with a router 108. The router 108 is in communication with a network 110, such as the Internet. A network management system 112 is also connected to the network 110, and is configured so as to have network connectivity with at least the APs 102*a-c* and router 108.

The network management system 112 is configured to monitor activity of the system 100. The network management system 112 monitors activity of the system 100 via messages 114*a*, 114*b*, 114*c*, 114*d*, 114*e*, 114*f*, 114*g*, 114*h*, 114*i*, and 114*j* that include information relating to operation of the system 100. For example, the messages 114*a-i* indicate, in various embodiments, operational parameter values of various devices included in the system 100, message activity of messages exchanged between network components of the system 100, or other information. For example, the network management system 112 collects information relating to operational parameters of one or more of devices, such as any of APs 102*a-d*, wireless terminals 104*a-d*, switch 106 or router 108. This information may include statistical information that is maintained by a respective device. For example, in some embodiments, one or more of the APs 102*a-d* maintains statistical information describing, for example, a number of wireless terminals associated with the respective AP, communication latencies or throughputs, delays in establishing connections or associations with wireless terminals, communication errors detected, packet collisions, packet errors, CPU utilization, memory utilization, I/O capacity, and other metrics that characterize communication conditions at the AP. In some embodiments, the network management system 112 is also configured to monitor individual messages based between network components of the system 100. For example, the network management system is configured to monitor, in some embodiments, network messages passed between the AP 102*a* and the switch 106, or the AP 102*b* and the router 108. This monitoring is achieved, in some aspects, via message summary information provided by the device (e.g. AP 102*a* or 102*b*) to the network management system. Examples of message summary information is provided below.

Figure 2:
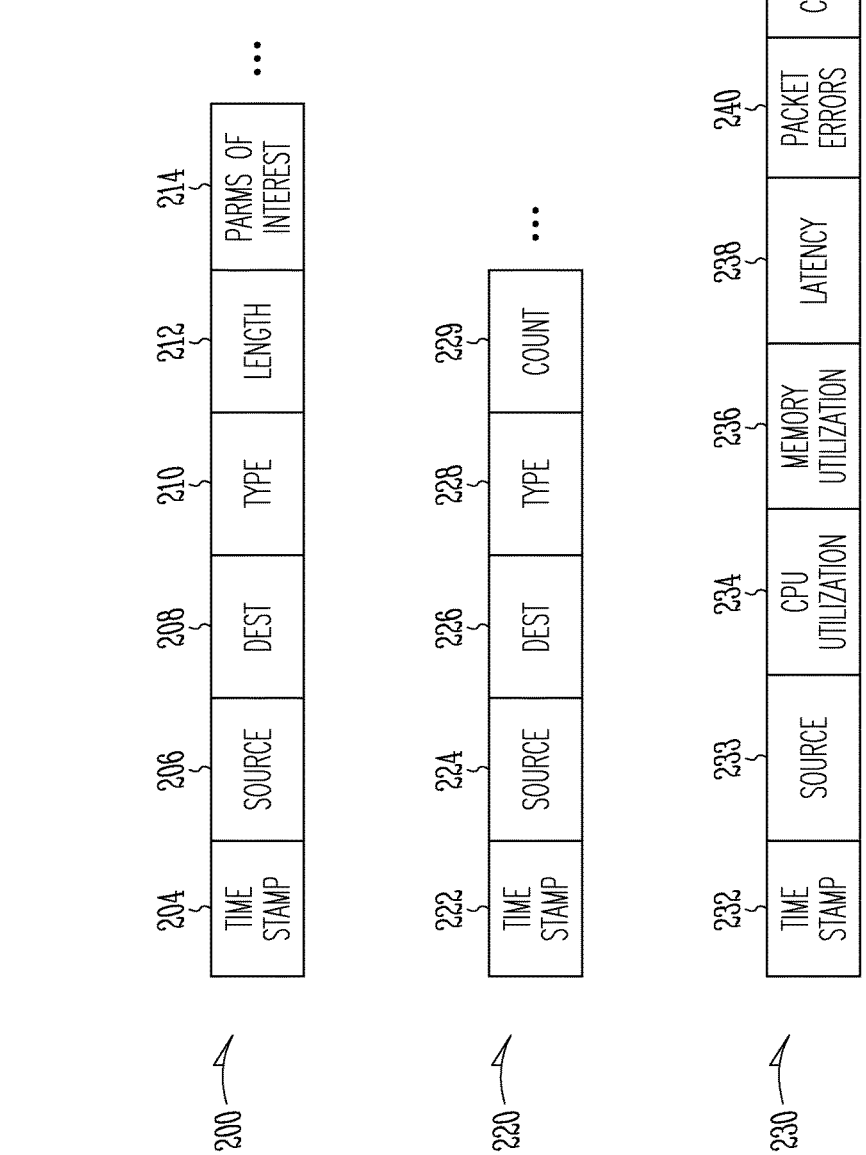
FIG. 2 shows example message portions that are implemented in one or more of the disclosed embodiments.

Based on the monitored activity and the operational parameters, the network management system is configured to perform one or more actions on one or more of the components of the system 100, at least when particular conditions are detected. For example, by monitoring operational parameters and/or individual messages passed between network components, the network management system 112 identifies that the system 100 is operating at a reduced level (relative to a nominal level). Further based on the monitoring of operational parameters and messages, the network management system 112 identifies possible root causes of the reduced performance of the system 100 and determines one or more actions to take. In some cases, the action(s) is designed to correct a problem identified by the network management system. In other cases, the action provides additional diagnostic information that allows the network management system to determine the root cause of the problem. These concepts are further elaborated below:

FIG. 2 shows example message portions that are implemented in one or more of the disclosed embodiments. Message portion 200, message portion 220, and message portion 230 discussed below with respect to FIG. 2 are included, in various embodiments, in one or more of the messages 114*a-j* discussed above with respect to FIG. 1. One or more fields of the example message portions shown in FIG. 2 are used in some of the disclosed embodiments to communicate message content information exchanged between network component devices of a network system (e.g. 100) to a network management system (e.g. 110) for processing.

FIG. 2 shows message portion 200, message portion 220, and message portion 230. Message portion 200 includes a timestamp field 204, source device field 206, destination device field 208, type field 210, length field 212, and parameters of interest field 214. The timestamp field 204 indicates a time when the message information described by remaining fields of the message portion 200 was generated. The source device field 206 identifies a source device of a message. The destination device field 208 indicates a destination device of the message. The type field 210 indicates a type of message. For example, the type field 210 indicates, in some embodiments, whether the message is a data message, a connection request message, a connection establishment message, a connection reset message, or some other message type. The length field indicates a length of the message. The parameters of interest field 214 indicates any other characteristic of the message that may be of interest. In some embodiments, the parameters of interest field 214 includes tagged values to assist a device decoding the message portion 200 in interpreting the contents of the parameters of interest field 214. The message portion 200 is used in those embodiments that send information on individual messages passed between components of the system 100 to the network management system 112. The message portion 200 generally does not aggregate data relating to multiple messages but instead represents a single message. While the message portion 200 provides a granular level of detail on the messages passed between components of the system 100 for example, it may impose more overhead on the system 100 than other messages discussed below.

Example message portion 220 includes a timestamp field 222, source device field 224, destination device field 226, type field 228, and count field 229. The timestamp field 222 defines a time period when message information conveyed by the message portion 220 was generated. In some embodiments, a machine learning model employed by one or more of the disclosed embodiments relies on values stored in the timestamp field 222 to establish time series of message exchanges upon which a diagnosis of a complex network system are derived. The source device field 224 identifies a source device of one or more messages. The destination device field 226 identifies a destination device of one or more messages represented by the message portion 220. A type field 228 indicates a type of the one or more messages represented by the message portion 220. The count field 229 identifies a number of messages represented by the message portion 220. Thus, while the message portion 200 represents a single message, and can therefore represent the message in more detail, e.g. via the parameters of interest field 214 and the length field 212, message portion 220 summarizes multiple messages of a particular type exchanged between a common source (e.g. source device field 224) and destination (e.g. destination device field 226). Some embodiments are configured to utilize both the message portion 200 and the message portion 220. For example, some embodiments utilize message portion 220 to summarize messages meeting a first criterion and message portion 200 to communicate information on messages meeting a second criterion. For example, certain types of messages (e.g. error message) are represented via message portion 200, where more detailed information is provided to the network management system 112, while message portion 220 is used to represent other message types (e.g. data messages or other messages indicative of nominal operation).

Example message portion 230 includes a timestamp field 232, CPU utilization field 234, memory utilization field 236, latency field 238, packet error count field 240, collisions count field 242, a number of connections field 244, and other operational parameter values field 246. Whereas message portion 200 and message portion 220 summarize or otherwise provide information on messages passed between components of a system being monitored (e.g. 100), message portion 230 is designed to communicate parameter values from a network component of the system being monitored (e.g. APs 102*a-d*) to the network management system 112. The timestamp field 232 defines a time period for which the operational parameter values defined by the message portion 230 were relevant. The source device field 233 identifies a device whose parameters are described by the message portion 230. The CPU utilization field 234 defines a CPU utilization of a device generating the message portion 230. The memory utilization field 236 defines a memory utilization of the device generating the message portion 230. The latency field 238 defines a latency imparted by the device or experienced by the device on the network. The packet errors field 240 defines a number of packet errors detected by the device. The collisions count field 242 defines a number of packet collisions experienced by the device. The number of connections field 244 defines a number of connections maintained by the device. The other operational parameter values field 246 define one or more other operational parameter values of the device. For example, other operational parameter values indicated by the message portion 230 can include but are not limited to an access point name, a basic service set identifier (BSSID), a communication channel, a communication frequency band, media access control (MAC) information, a number of associated wireless terminals of a network component device (e.g. at an AP) or a service set name.

FIG. 3 shows example data structures that are maintained by one or more of the disclosed embodiments. While the data structures are described with respect to FIG. 3 as relational database tables, other embodiments utilize other data organization methods. For example, some embodiments utilize traditional in memory structures such as arrays or linked lists, trees, queues, graphs, or other data structures. In other embodiments, an unstructured data storage technology is relied upon.

FIG. 3 shows a model output table 300, root cause table 310, an action table 320, an alert list table 330, a class table 340, and a diagnostic action table 350. The model output table 300 includes a probability field 304 a cause identifier field 306, and a component identifier field 308. The probability field 304 defines a probability that a root cause identified via the cause identifier field 306 is a root cause of a problem identified by a model as employed in this disclosure. The cause identifier field 306 uniquely identifies a root cause, and may be cross referenced with field 312, discussed below, in the root cause table 310. The component identifier field 308 identifies a component associated with the cause (identified via the cause identifier field 306). For example, the component identifier field 308 identifies a software component or process, hardware component or process, or a device. The root cause table 310 maps a cause (identified via cause identifier field 312) to one or more actions (identified via field 314). The root cause table 310 also includes an alert list identifier field 316. The alert list identifier field 316 identifies a list of addresses to alert when a particular cause is identified (the cause identified by the cause identifier field 312). Thus, root cause table 310 represents that multiple different actions (or a single action) can be appropriate for a single route cause (identified via the cause identifier field 312).

The action table 320 includes an action identifier field 322, action type field 324, action function field 325, cost function field 326, a confidence value (e.g. resolution probability if the action is taken) 328, and an action permitted field 329. The action identifier field 322 uniquely identifies a particular action that is performed in one or more of the disclosed embodiments. The action type field 324 indicates whether the action is designed to rectify a problem or provide additional diagnostic information as to a root cause of the problem. The action function field 325 stores information that allows an implementation to perform the identified action. For example, the action function field 325 may store an entry point to an API that implements the action, in some embodiments. Examples of actions include restarting a specific radio in an access point, restarting a beacon in an access point, restarting only radios with a specific frequency (e.g. 2.4 Ghz and/or 5 Ghz) in an access point, restart a device (such as an AP). Other examples of possible actions include upgrading software running on a device, upgrading driver software, application software upgrade, software upgrade for a specific module.

The cost function field 326 defines a cost function for the action. At least some of the disclosed embodiments utilize a cost function defined by the field 326 to determine a cost of invoking the action. This cost information is used in some embodiments to select between multiple actions. The confidence value field 328 indicates, for rectifying actions, a probability the action will resolve the root cause problem. Some embodiments may relate the cost of an action to a probability or confidence that the action resolves the root cause when determining whether to invoke an action. For example, some embodiments determine a cost of performing an action based on an impact of the action divided by a probability or confidence that the impact fixes the identified problem. In other words, some embodiments determine a cost of an action to be inversely related to a probability or confidence that the action fixes the underlying issue. The action permitted field 329 defines whether the action can be automatically performed in a particular implementation. For example, some embodiments provide a user interface that allows system administrators or other individuals to define which rectifying actions can be automatically performed by the disclosed embodiments. This user interface is, in various embodiments, a graphical user interface or even something simple such as a text configuration file that defines the permitted or unpermitted actions. Thus, some embodiments consult the permitted field 329 before performing an action to confirm such action is permitted. Otherwise, if the action is not marked as permitted, one or more alerts may still be generated to an appropriate distribution list, as described above and below with respect to the alert list identifier field 316 and the alert list table 330.

The alert list table 330 includes an alert list identifier field 332 and an alert address field 334. The alert list identifier field 332 uniquely identifies an alert distribution list. The alert address field 334 identifies one address included in the alert distribution address (that is identified via alert list identifier field 332). Multiple rows for a single alert list identifier value are included in the alert list table 330 when an alert distribution list includes multiple addresses.

The class table 340 includes a class identifier field 342 and an alert list identifier field 344. The class identifier field 342 can be cross referenced with the class id field 315, discussed above with respect to root cause table 310. The class table 340, or similar data structure, is implemented in embodiments that prefer to associate a distribution list or alert list with a class of causes (e.g. software, hardware, driver, etc.) rather than with each individual cause (e.g. divide by zero, out of memory, etc.). Thus, some embodiments associate a distribution with a class of a root cause instead of with each root cause itself.

The diagnostic action table 350 includes a component type identifier field 352 and an action identifier field 354. The diagnostic action table 350 maps from component types (via field 352) to possible diagnostic actions (e.g. via field 354) to take when a component of the indicated type is experiencing a problem (or may be experiencing a problem).

The injection history table 360 includes an action identifier field 362, injection time field 364, component identifier field 366, and a probability improvement field 368. The action identifier field 362 uniquely identifies a diagnostic action. The action identifier field 362 can be cross referenced with the action identifier field 362 or the action identifier field 322, or action identifier field 354. The injection time field 364 identifies a time at which the diagnostic action was injected. The component identifier field 366 identifies a component upon which the injection was performed. For example, if the action is a restart, the component identifier field 366 identifies the component that was restarted. In various embodiments, the component identifier is comprised of multiple parts. For example, a first part identifies a physical device in some aspects (e.g. station address or other unique identifier) and a second part identifies a component of the physical device (e.g. wireless chip, CPU, software component, or other hardware component). In accordance with an example embodiment when the diagnostic action is not injected into the same component that exhibits the higher likelihood of being the root cause of the performance degradation, table 360 includes first component ID that identifies the component into which the diagnostic action is injected, a second component ID (not shown in the figure) identifying the component which exhibits the highest likelihood of being the root cause of the underlying issue. When the same diagnostics action is injected more than one time, the table 360 also includes a probability improvement field 368 indicating the improvement achieved in identifying the root cause by reapplying the diagnostics action.

The component table 370 maps from a component identifier via field 372 to a component type via field 374. Some embodiments utilize the component table 370 to determine a type of a component from a component identifier. For example, some embodiments of a machine learning model, discussed below, provide likely root causes and component identifier of components potentially causing a problem. The component table 370 is used in some embodiments to determine a type of the component identifier by the machine learning model.

FIG. 4A is a graph 400A of data demonstrating an example of an action that rectifies an underlying root cause. The measured SLE parameter in this case is a counter of Ethernet errors on a specific link Ethernet link. Prior to injecting an action into the system, in this case a restart of a communication link, the system experienced high link error rate. At time 410, a restart action 405 is invoked. The injected action proved to be a correction action which reduced the error rate to zero. No further action needed to be taken.

Figure 4B:
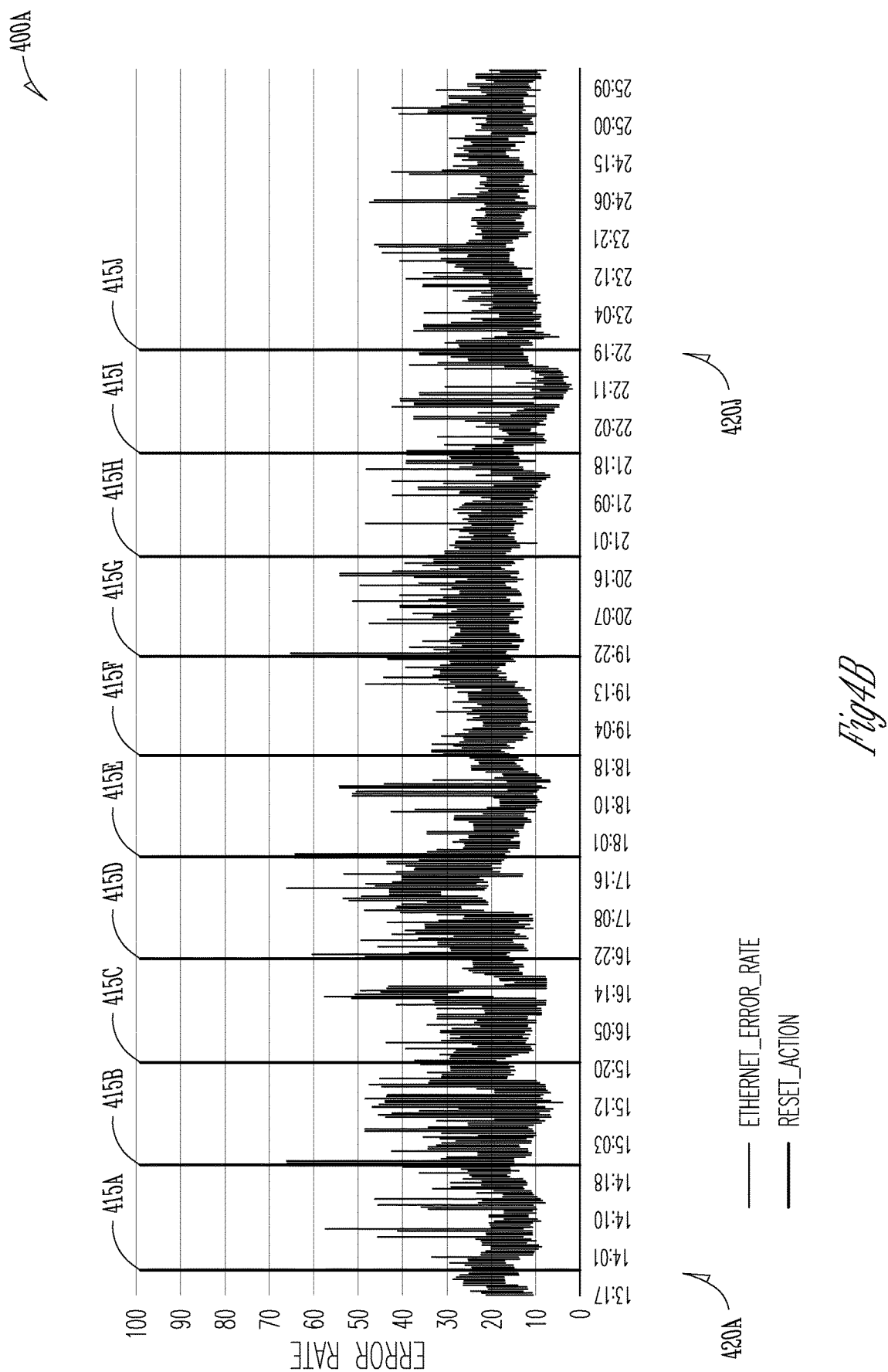
FIG. 4B shows an example action that does not remedy the underlying root cause.

FIG. 4B is a graph 400B of data demonstrating an example action that does not remedy an underlying root cause. A measured SLE parameter in the example data of FIG. 4B is a counter of Ethernet errors on an Ethernet link. Prior to injecting an action, in this case a restart of a communication link, the system experienced a high error rate. At times 420a through 420j, restart action 415a, restart action 415b, restart action 415c, restart action 415d, restart action 415e, restart action 415f, restart action 415g, restart action 415h, restart action 415i, and restart action 415j are invoked. FIG. 4B shows that the injected actions do not rectify the underlying issue and the Ethernet errors continue at the same rate and are thus unaffected by the restart action. The error counts shown in FIG. 4B at different times are recorded and stored for later addition to historical information 730, discussed further below.

Some of the disclosed embodiments measure SLE and system parameter values after the action is performed. For example, in the example of FIG. 4B, an Ethernet error rate is monitored after the link is restarted. If the error rate is not reduced as a result of the link restart, a new root cause is identified. For example, in some embodiments the new root cause indicates the problem is caused by a loose Ethernet cable or a HW issue. Some embodiments then generate an alert, via any known messaging technology, which functions to notify a human support technical to rectify the issue. In this case, the alert may indicate that the physical connection of the ethernet link should be verified, and if all is well with the physical connection, the ethernet hardware should be swapped out for service.

Figure 4C:
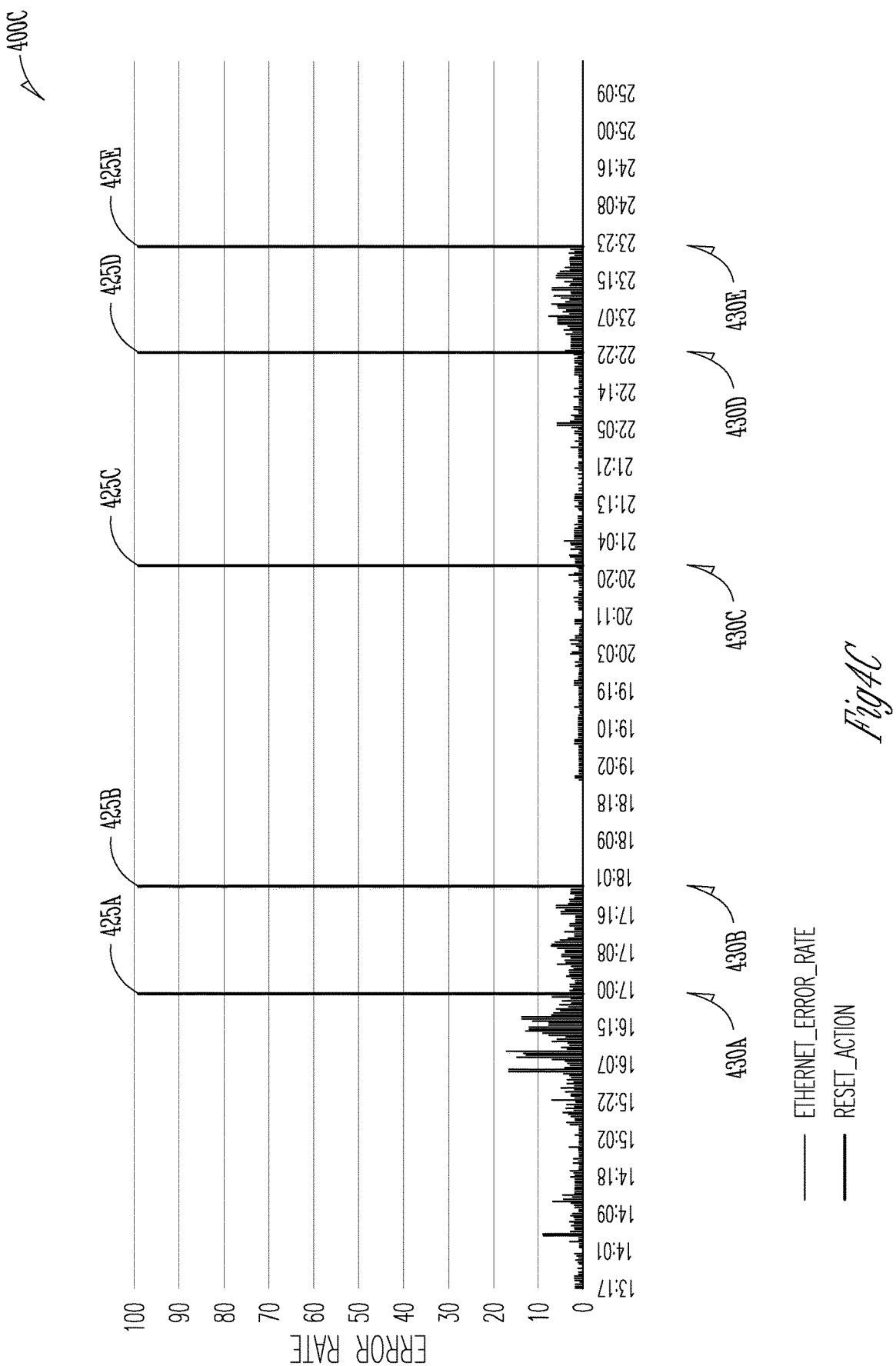
FIG. 4C shows an example of an action that does not remedy the underlying root cause.

FIG. 4C is a graph 400C of data demonstrating an action that does not remedy the underlying root cause. The measured SLE parameter in this case is a counter of Ethernet errors on a specific Ethernet link. Prior to performing the action, (e.g., a restart of a communication link), the monitored system experienced high error rate. At each of time 430a, time 430b, time 430c, time 430d, and time 430e, restart action 425a, restart action 425b, restart action 425c, restart action 425d, and restart action 425e are performed. As shown by the graph 400C, the actions do not rectify the underlying issue and the Ethernet errors continue at the same rate unaffected by the restart action(s). This can be seen at each of time 430a, time 430b, time 430c, time 430d, and time 430e. In some embodiments, the error counts are recorded and stored and are included in historical SLE measurements. These error counts may be used as training for a machine learning model, as discussed further below.

In this specific example, the disclosed embodiments monitor the SLE measurements and system parameters (e.g., CPU utilization, memory consumption, etc.) after the action is performed (e.g., Ethernet error rate post link restart) and determines that since the action did not resolve the problem, the problem is most likely being caused by a defect in the software or firmware of the monitored system. Some disclosed embodiments then generate an alert, via any known messaging technology, to alert a human to the problem. Some embodiments automatically initiate an update of software and/or firmware installed on the monitored system. For example, if the embodiments determine that the underlying issue is caused by software (rather than by some other component, e.g., hardware) and these existing software and/or firmware versions are below a threshold version level, an upgrade is performed. In some embodiments, an analysis is made between known defects with the existing software and/or firmware versions and the problem exhibited by the monitored system. If the similarly between the exhibited problem and a problem described with respect to the existing software/firmware version, the disclosed embodiments initiate a software and/or firmware upgrade to a newer version (which will likely resolve the problem).

Figure 5:
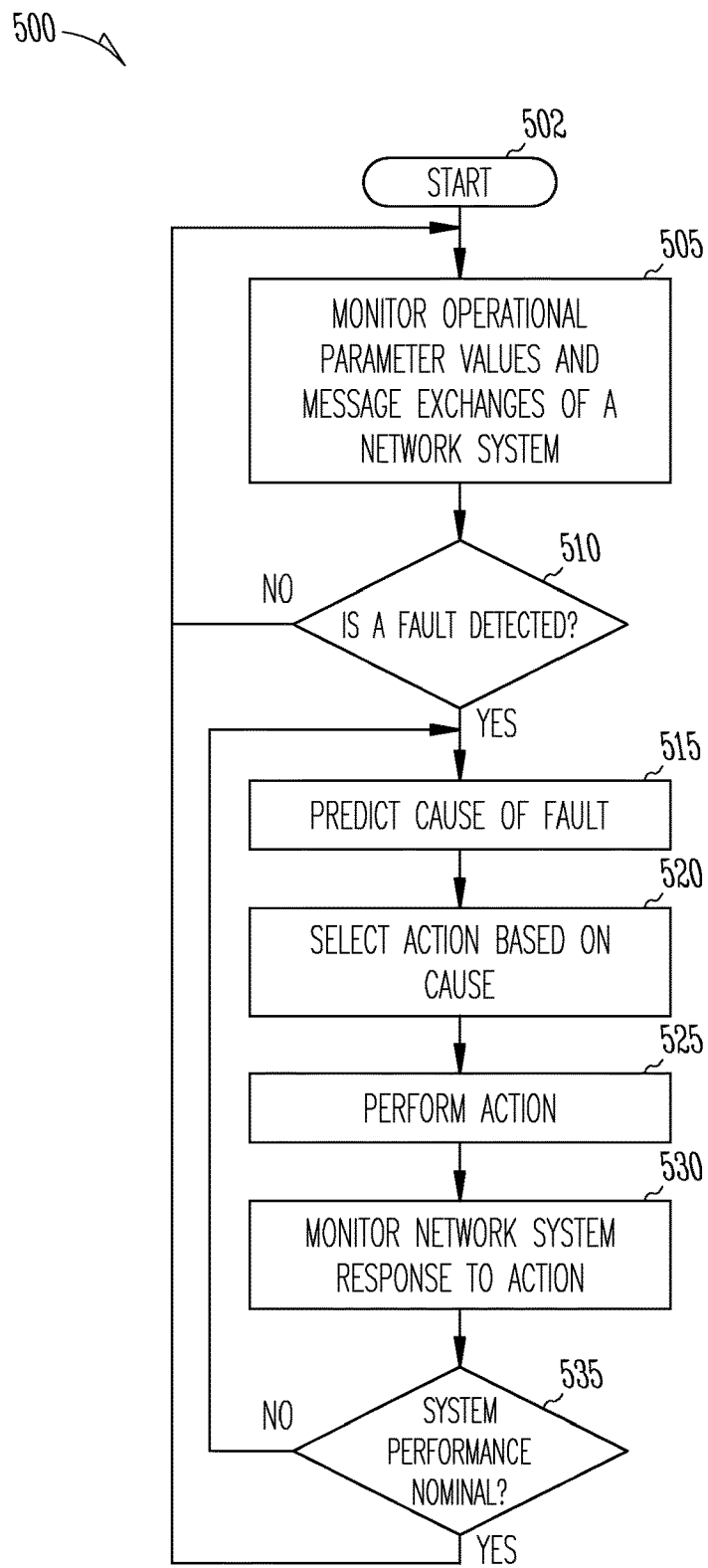
FIG. 5 is a flowchart of an example process for detecting and resolving a problem with a network system.

FIG. 5 is a flowchart of an example process for detecting and resolving a problem with a network system. In some embodiments, one or more of the functions discussed below with respect to FIG. 5 are performed by hardware processing circuitry. For example, in some embodiments, instructions (e.g. 1524) stored in an electronic memory (e.g. 1504 and/or 1506) configure the hardware processing circuitry (e.g. 1502) to perform one or more of the functions discussed below with respect to FIG. 5 and process 500. In some embodiments, the network management system 112 performs one or more of the functions discussed below with respect to FIG. 5.

After start operation 502, process 500 moves to operation 505, which monitors operational parameter values and/or message exchanges of a network system. For example, as discussed above with respect to FIGS. 1 and 2, operational parameter values of network component devices such as one or more of the APs 102a-c, router 108, wireless terminals 104a-d, or the switch 106 are provided to a network management system (e.g. 112). In some embodiments, each of the network component devices maintain statistical information that indicate operational parameters of these devices. In other embodiments, network monitoring devices are deployed at strategic locations within the network system so as to collect this information either with or without direct involvement from the network component devices.

This statistical information includes one or more of CPU utilization, memory utilization, a number of established connections, latency measurements, throughput measurements, dropped connection counts, roaming information, packet error information, collision information, media access control (MAC) information, access point identification information such as basic service set identifiers, association identifiers, or other indicators of component health and/or network performance. In some embodiments, operation 505 also includes obtaining information on messages exchanged between network component devices of the monitored network system. For example, as discussed above, in some aspects, messages including one or more fields of example message portion 200, message portion 220, or message portion 230 are provided to a network management system (e.g. 112). The one or more fields convey information relating to the number and types of messages exchanged between components of the monitored network system. The operational parameter values and/or message exchange information is received by a network management system (e.g. a device performing the process 500) from one or more component devices of the network system. For example, one or more of the APs 102a-c may send messages (e.g. any of the message portion 200, message portion 220, or message portion 230) to the network management system (e.g. 112).

The statistical information relating to operation of each network component device can be described as a time series. Thus, in some embodiments, operation 505 includes receiving, from a plurality of devices included in the network system, a time series of the respective devices operational parameter values. In some embodiments, each of these time series are provided to a machine learning model, as discussed further below.

Decision operation 510 determines if a fault is detected based on the monitored operational parameter values. In some aspects, the detection of a fault is detected via a machine learning model. For example, as discussed above, a machine learning model is trained in some embodiments to detect a system operating in a sub-optimal or otherwise unsatisfactory condition. In other embodiments, the detection is based on evaluating one or more operational parameter values of the monitored system against one or more criterion. In some embodiments, the fault is detected based on a probability or confidence provided by the machine learning model being above a threshold. For example, as discussed below with respect to FIG. 9, some embodiments of a machine learning model provide a plurality of probability or confidence indications that a corresponding plurality of root causes are responsible for a fault. If all of these probability or confidence indications are below a predetermined threshold, some embodiments interpret operation of the monitored system to be considered normal or nominal. (e.g. no fault detected). If any one of these indications is above a predetermined threshold, decision operation 510 determines a fault is detected (note that each root cause may have its own predetermined threshold for detecting a fault in some embodiments). If a fault is detected, process 500 moves from decision operation 510 to operation 515. Otherwise, if no fault is detected, process 500 moves from decision operation 510 back to operation 505.

In operation 515, a root cause of the problematic operating condition is predicted. As discussed above, in some embodiments, a machine learning model is trained to indicate probabilities that a plurality of different root causes are occurring in the monitored system. As discussed above with respect to FIG. 3, the machine learning model generates, in some embodiments, a plurality of probabilities (e.g. 304), with each probability or confidence associated with a root cause (e.g. via field 306).

In operation 520, an action is selected based on the root cause. As discussed above, a root cause can be associated with multiple possible actions. Operation 520 evaluates the possible actions with respect to their respective cost and probability or confidence of resolving the problem. This is discussed further with respect to FIG. 6 below.

Operation 525 performs the selected action. The selected action can include one or more of restarting a software process or component of a network device included in the network system being monitored, resetting an entire network device (e.g. power cycle), adjusting one or more configuration parameters of a network device or software component of a network device, resetting a particular hardware component of a network device (e.g. resetting a network card or chip of a network device while maintaining operation of a GPU of the device). In some embodiments, performing the action includes determining a class of the cause e.g., whether the cause is a result of hardware, software, a driver, or other technical component. In some embodiments, performing the action includes forwarding a notification to a specific distribution list based on the cause. For example, as discussed above with respect to FIG. 3, some embodiments associate a distribution list (e.g. via alert list identifier field 316) with a cause. The distribution list is then notified, in at least some embodiments, when the cause is identified. Note that in some cases, the selected action can be null or no action. This may result in an alert being generated to a specified distribution list without any corrective action being performed.

Operation 530 monitors the system in response to the performed action. For example, as discussed above with respect to FIGS. 4A-C, system behavior after the action is performed is analyzed to determine, in some cases, whether the system has returned to normal operation. This is the case when the selected action is designed to resolve the issue. In some cases, the selected action is designed to elicit additional information for determining a root cause. For example, in some embodiments, the selected action queries a network component for status information, or requests the network component to perform a function. A result of the request can be used to determine whether a network component is functioning properly or has experienced a fault.

In some embodiments, the monitoring of the system of operation 530 is performed by a machine learning model. The machine learning model generates an indicator of whether the system has returned to normal operation. In some embodiments, the monitored time series of operational parameter values and/or message exchanges between network component devices is processed by one or more heuristics, with the output of the heuristics (the processed time series) provided to the machine learning model. For example, in some embodiments, rather than providing specific link errors to the machine learning model, heuristics determine whether a rate of change of a link error rate over time. For example, the rate of change is classified in some embodiments, as constant with time, increasing slowly with time, or increasing more rapidly with time. Some embodiments classify a timeframe of change of the link error rate. For example, the timeframe is classified as link errors start growing n seconds after a restart, start growing immediately after the restart, or other classification. In these embodiments, heuristics map each one of these different classifications into different error growth types. The error growth type is then provided to the machine learning model.

Decision operation 535 evaluates whether the system has returned to normal or nominal operation. If the system has returned to normal operation, process 500 returns to operation 505 from decision operation 535 and continues to monitor the system for new indications of problems. If the system has not returned to normal operation, process 500 moves from decision operation 535 to operation 515, where a second root cause has been identified. The second root cause identified in a second iteration of operation 515 is generally more specific than the root cause identified during the first iteration of operation 515.

Figure 6:
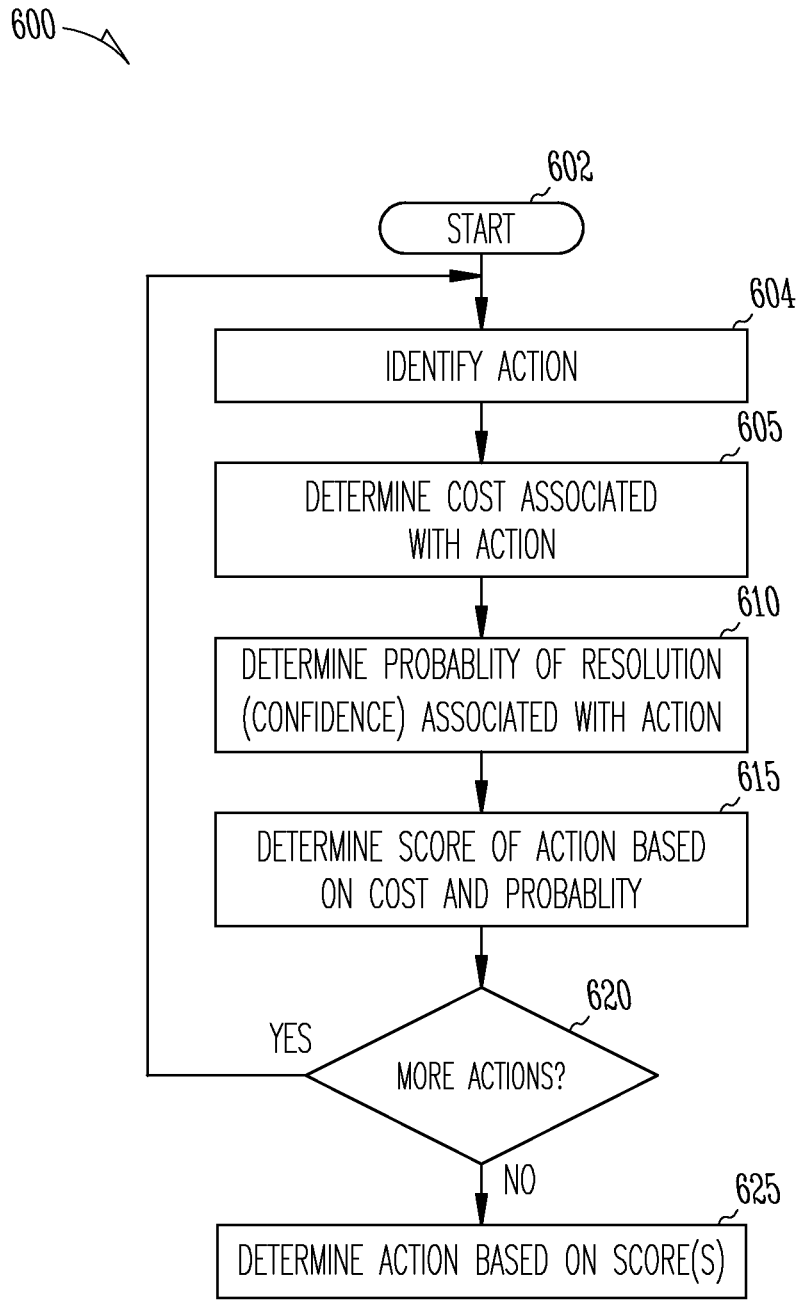
FIG. 6 is a flowchart of an example process for selecting an action to invoke on a monitored system.

FIG. 6 is a flowchart of an example process for selecting an action to invoke on a monitored system. In some embodiments, one or more of the functions discussed below with respect to FIG. 6 are performed by hardware processing circuitry. For example, in some embodiments, instructions (e.g. 1524) stored in an electronic memory (e.g. 1504 and/or 1506) configure the hardware processing circuitry (e.g. 1502) to perform one or more of the functions discussed below with respect to FIG. 6 and process 600. In some embodiments, the network management system 112 performs one or more of the functions discussed below with respect to FIG. 6.

In some embodiments, the network management system 112 performs one or more of the functions discussed below with respect to FIG. 10.

The process 600 discussed below is utilized, in some embodiments, when a root cause of a problem has been identified. The root cause is associated with one or more actions that can be performed in response to the root cause. These actions have various costs associated with them. For example, in some embodiments, a first action is transparent to users and will impart no negative effects (querying a network component for status information). A second action causes users to lose connectivity or experience reduced functionality in some other way (e.g. slower data transfer, higher network jitter, etc.). Thus, the first action is selected based on the cost in some embodiments. Also considered by the process 600 discussed below is a probability or confidence that each action will resolve the root cause problem. Thus, when some actions may impart a higher cost on the monitored system, if these actions also provide for a high probability or confidence of resolution relative to other less costly actions, they may be justified in some situations.

After start operation 602, an action is identified in operation 604 The action is associated with a root cause in at least some embodiments (e.g. via root cause table 310). In operation 605, a cost associated with the action is determined. For example, as discussed above with respect to FIG. 3, some embodiments maintain an action table (e.g. 320) or other data structure that provides cost information for a particular action. The particular action is identified, in some embodiments, based on a determined root cause (e.g. via the root cause table 310, discussed above). In some embodiments, the action's cost is a function of one or more parameters of the system being monitored. For example, in a system experiencing severe degradation, a cost of some actions (e.g. restarting a computer or other network component) may be relatively smaller than when the action is performed on a system experiencing only minor problems. Thus, some cost functions for actions may receive input parameters to determine the appropriate cost. In various embodiments, the input parameters could include any one or more of the operational parameters discussed above. In some embodiments, the cost of an action is based on a number of users affected by the action. This cost is dynamically determined in some embodiments before the cost is utilized to determine an action to perform.

In operation 610, a probability or confidence of resolution of the underlying issue by the action is determined. For example, as discussed above, some embodiments associate a resolution probability with an action via an action table (e.g. 320).

In operation 615, a score of the action is determined based on the cost and the probability or confidence. In some embodiments, the score is determined by dividing the cost by the probability or confidence. In some other embodiments, one or more weights may be applied to the cost and/or the probability or confidence before the multiplication is performed.

Decision operation 620 determines if additional actions are available for comparison (e.g. multiple actions associated with the root cause). If there are additional actions, process 600 moves from decision operation 620 to operation 605. As process 600 iterates, a second action, and a second cost, along with a second probability or second confidence are identified, in at least some embodiments, resulting in a second score. Additional iterations can result in a third action, third cost, and third probability/confidence, and a third score can then be determined. If no further actions remain, process 600 moves from decision operation 620 to operation 625, which compares the determined score(s) to select an action. In some embodiments, an action with a highest or lowest score is determined or selected. This action is then applied to a network system being monitored.

Figure 7:
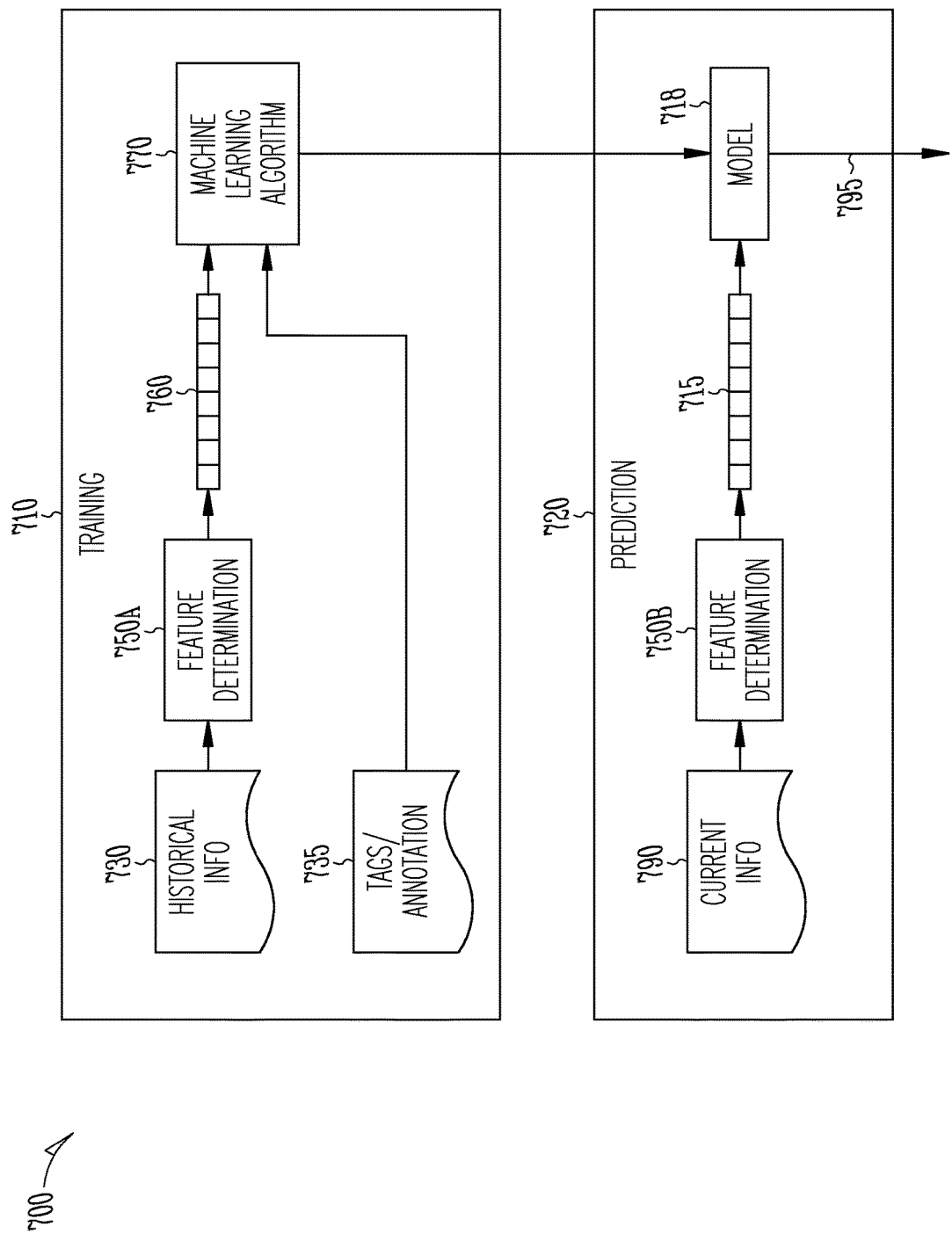
FIG. 7 shows an example machine learning module 700 according to some examples of the present disclosure

FIG. 7 shows an example machine learning module 700 according to some examples of the present disclosure. Example machine learning module 700 utilizes a training module 710 and a prediction module 720. Training module 710 uses historical information 730 as input into feature determination module 750a. The historical information 730 may be labeled. Example historical information may include historical operational parameter values such as any of the operational parameter values discussed above, such as but not limited to CPU utilization, memory utilization, latency measurements, error counts, collision metrics, throughput measurements. In some example embodiments, as explained above, the input includes historical data or operational parameter data processed by heuristics. The historical information 730 also includes, in some embodiments, one or more indications of messages passed between network components of a system being monitored. For example, in some embodiments, one or more of the fields described above with respect to message portion 200, message portion 220, or message portion 230 are included in the historical information. The historical information 730 also includes, in some embodiments, actions performed by the disclosed embodiments and operational parameter values and/or messaging activity of the monitored system after the action is performed. Thus, the historical information includes, in at least some embodiments, a response by the network system to selected actions. For example, if an action selected by the disclosed embodiments queries a status of a network component or requests a task to be performed by a network component, that action and the result are included in the historical information in some embodiments. These indications are stored in a training library (e.g. such as the historical information 730) of network data in some embodiments.

Labels/annotation information 735 included in the training library indicate for example, whether time correlated network data is associated with nominal or acceptable system performance. Labels also indicate whether time correlated network data is associated or indicative of unacceptable or problematic system performance. The tags/annotation training data also indicates, in some embodiments, root causes of network data that indicates problematic system performance. Labels are also provided, in some embodiments, for system reactions to actions performed by the disclosed embodiments. For example, in some cases, the machine learning model generates a suggested action that includes generating a status request to the system being monitored. Alternatively, the machine learning model generated a suggested action that generated a request that the system perform a particular task (transfer data, open a connection, restart a server, etc.). This generated action is included in the historical training data. A label is then applied indicated whether a response by the monitored system to the generated action indicates that the generated action resolved the issue, or that the response to the generated action indicates a second or different root cause of a problem.

Feature determination module 750a determines one or more features from this historical information 730. Stated generally, features are a set of the information input and is information determined to be predictive of a particular outcome. In some examples, the features may be all the historical activity data, but in other examples, the features may be a subset of the historical activity data. In some embodiments, the features are encoded into a feature vector 760. In some embodiments, feature determination module 750a utilizes one or more heuristics when processing the historical information 730 to determine features in feature vector 760. The machine learning algorithm 770 produces a model 718 based upon the feature vector 760 and the label.

In the prediction module 720, current information 790 may be used as input to the feature determination module 750b. The current information 790 in the disclosed embodiments, include similar indications of that described above with respect to the historical information 730. However, the current information 790 provides these indications for contemporaneous messaging activity or operational parameter values of a monitored system. For example, contemporaneous activity of a monitored system is provided to the feature determination module 750b to determine, in some embodiments, whether the monitored system is experiencing an operational problem and if so, what the most likely root cause is.

Feature determination module 750b may determine the same set of features or a different set of features from the current information 790 as feature determination module 750a determined from historical information 730. In some examples, feature determination module 750a and 750b are the same module. Feature determination module 750b produces feature vector 715. In some embodiments, feature determination module 750b utilizes one or more heuristics when processing the current information 790 to determine features in feature vector 715. Feature vector 715 is then provided as input to the model 718 to generate an output 795. An example of an output 795 is discussed below with respect to FIG. 9. The training module 710 may operate in an offline manner to train the model 718. The prediction module 720, however, may be designed to operate in an online manner. It should be noted that the model 718 may be periodically updated via additional training and/or user feedback.

The machine learning algorithm 770 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 710. In an example embodiment, a regression model is used and the model 718 is a vector of coefficients corresponding to a learned importance for each of the features in the feature vector 760, and feature vector 715. In some embodiments, to calculate a score, a dot product of the feature vector 715 and the vector of coefficients of the model 718 is taken.

Figure 8:
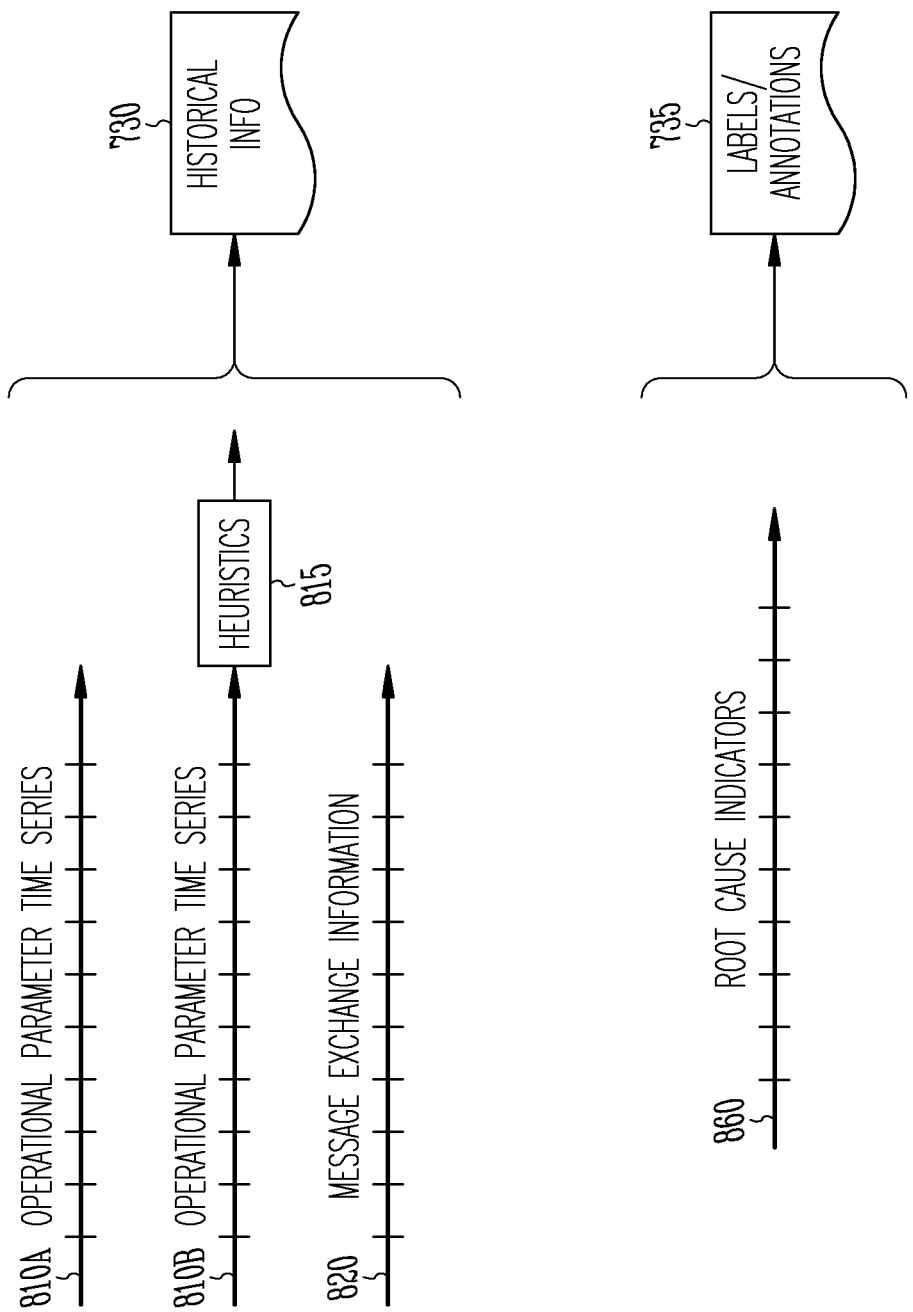
FIG. 8 illustrates data flow that is implemented in one or more of the disclosed embodiments.

FIG. 8 illustrates data flow that is implemented in one or more of the disclosed embodiments. FIG. 8 illustrates the historical information 730 discussed above with respect to FIG. 7 that is used by at least some of the disclosed embodiments to train a machine learning model. The historical information can include a time series of operational parameter values 810a. A time series for one or more of the example operational parameters discussed above is provided as historical information in at least some embodiments. For example, a time series relating to packet errors, CPU utilization, memory utilization, latency, throughput, or other operational parameters are provided as historical information in some embodiments. Note that one or more of the operational parameter time series is provided for one or more network devices or components of a system being monitored. Thus, for example, operational parameters for each of the APs 102a-c discussed above with respect to FIG. 1 are provided in some aspects (e.g. latency experienced at AP 102a and latency experienced at AP 102b).

FIG. 8 also shows a second operational parameter time series 810b that is processed by heuristics 815 before being included in historical information 730. While FIG. 8 shows heuristics 815 being applied before the second operational parameter time series 810b is stored or otherwise included in historical information 730, in some embodiments, the heuristics 815 are applied to the second operational parameter time series 810b after being read from historical information 730 but before being provided to a machine learning model.

In various embodiments, the historical information 730 also includes message exchange information 820. Message exchange information represents information regarding messages exchanged between components of a monitored system. For example, with respect to FIG. 1, the message exchange information 820 indicates messages exchanged between, for example, the AP 102c and wireless terminal 104c, AP 102b and router 108, switch 106 and router 108, or the AP 102c and wireless terminal 104d. The message exchange information 820 is not limited to these examples of course. In some embodiments, the message exchange information 820 includes one or more of the fields discussed above with respect to any one or more of message portion 200, message portion 220, or message portion 230. In some embodiments, the message exchange information 820 is a time series of message exchange information. For example, if the wireless terminal 104c sends an association request message to the AP 102a and the AP 102a responds to the association request message with an association response message, the message exchange information 820 represents that the association request message preceded the association response message in time.

Also shown in FIG. 8 is label/annotation information 735 discussed above with respect to FIG. 7. In some embodiments, whether a system being monitored is behaving in an acceptable manner is determined without relying on a machine learning model. For example, some embodiments monitor one or more operational parameter values and evaluate these monitored values against corresponding criterion that determine acceptability of the monitored parameter values. If the monitored parameter values fail to meet the criterion, then the monitored operational parameter values are considered to be not acceptable.

The labels/annotation information 735 include, in some embodiments, root cause indicators 860. The root cause indicators 860 are time correlated with the historical information 730. The root cause indicators 860 are, in some embodiments, network device or component specific. For example, a root cause indicator indicates in some embodiments, one or more of a device, and/or a component of the device (e.g. a network interface chip of an access point) responsible for a problem. The root cause indicators 860 are consistent, in at least some embodiments, with the root cause table 310 discussed above with respect to FIG. 3. Some embodiments also associate one or more rectifying actions with each root cause indicator included in root cause indicators 860.

Figure 9:
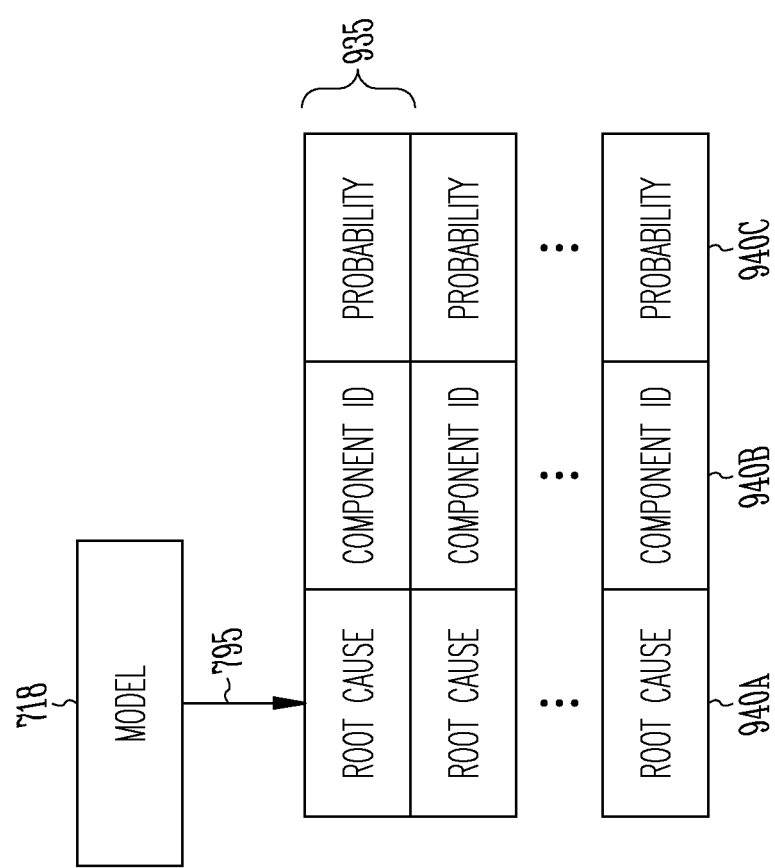
FIG. 9 shows data flow relating to a machine learning model that is implemented in one or more of the disclosed embodiments.

FIG. 9 shows data flow relating to a machine learning model that is implemented in one or more of the disclosed embodiments. FIG. 9 shows the model 718 discussed above with respect to FIG. 7, and an output 795 generated by the model. The output 795 includes one or more root cause indicators 935. Each of the one or more root cause indicators 935 indicates a root cause (e.g. root cause ID such as described with respect to one or more of model output table 300, and/or the root cause table 310 of FIG. 3). Note that by providing an indicator of a root cause, the machine learning model provides possible actions to take based on the root cause. For example, as discussed above with respect to FIG. 3, some embodiments map causes to actions via a data structure similar to the root cause table 310. In some other embodiments, both causes and actions, or only causes, are provided by the machine learning model 718.

Each of the one or more root cause indicators 935 also includes a component id field 940*b*. The component id 940*b* indicates a particular component that is identified as causing the problem. The component id 940*b* identifies, in various embodiments, one of a physical device, software or firmware component of a device, a particular hardware component of a device (e.g. a chip, interface, power supply, or other device component).

Each of the one or more root cause indicators 935 also includes a probability or confidence indicator 940*c*. The probability or confidence indicator 940*c* indicates a probability that the system being monitored is experiencing a problem caused by the root cause identified by the corresponding individual root cause indicator 940*a*.

Figure 10:
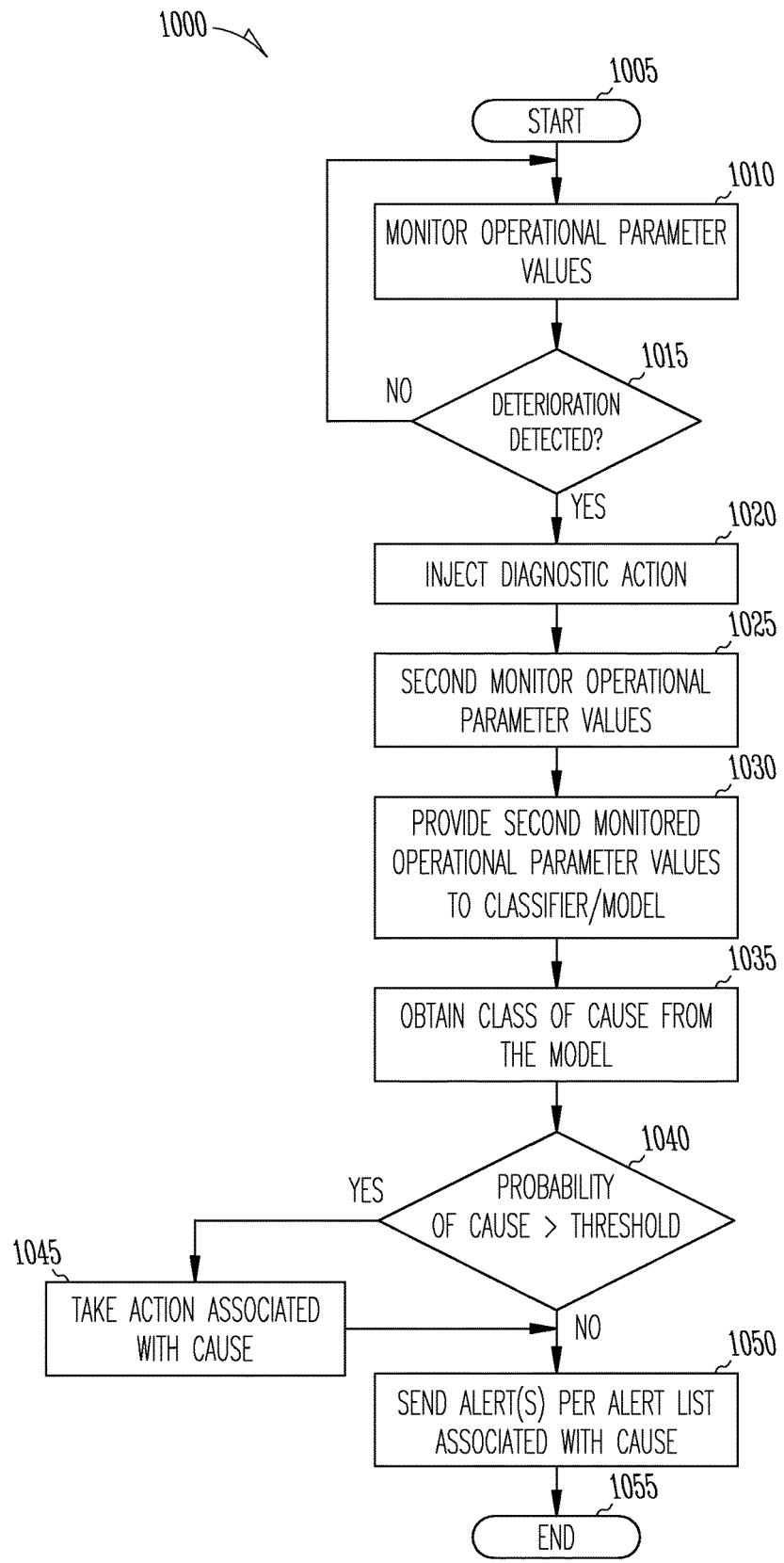
FIG. 10 is a flowchart of an example method for determining a class of a problem experienced by a monitored system.

FIG. 10 is a flowchart of an example method for determining a class of a problem experienced by a monitored system. In some embodiments, one or more of the functions discussed below with respect to FIG. 10 are performed by hardware processing circuitry. For example, in some embodiments, instructions (e.g. 1524 below) stored in a memory (e.g. 1504, 1506), configure the hardware processing circuitry (e.g. 1502) to perform one or more of the functions discussed below. In some embodiments, the network management system 112 performs one or more of the functions discussed below with respect to FIG. 10.

After start operation 1005, process 1000 moves to operation 1010, which monitors operational parameter values. For example, as discussed above with respect to FIGS. 1 and 2, operational parameter values of network component devices such as one or more of the APs 102*a*-*c*, router 108, wireless terminals 104*a*-*d*, or the switch 106 are provided to a network management system (e.g. 112). In some embodiments, each of the network component devices maintain statistical information that indicate operational parameters of these devices. In other embodiments, network monitoring devices are deployed at strategic locations within the network system so as to collect this information either with or without direct involvement from the network component devices.

Decision operation 1015 determines if any deterioration is detected in the monitored operations parameters (e.g. monitored during operation 1010). If no deterioration is detected, process 1000 moves from decision operation 1015 to operation 1010, where monitoring of operational parameter values continues as described above. Otherwise, when performance deterioration is detected, process 1000 moves from decision operation 1015 to operation 1020, which injects a diagnostic action.

In some embodiments, operation 1020 obtains a likely component causing a problem via a machine learning model, such as the machine learning model 718 discussed above with respect to FIGS. 7-9. For example, as discussed above with respect to FIG. 9, some embodiments of the machine learning model 718 generate root cause indications (e.g. 940*a*) and component identifiers (e.g. 940*b*) associated with the root cause Based on the component identifier, operation 1020 then identifies one or more diagnostic actions that can be taken to gain additional information regarding the possible problem (e.g. via the diagnostic action table 350). When multiple diagnostic actions are possible for a given component, various embodiments select which action to take using a variety of techniques. Some embodiments select a lowest cost diagnostic action. As discussed above, in some embodiments, costs of diagnostic actions are dynamically determined. For example, in some embodiments, based on the particular component and/or device identified as likely a source of a problem, and a number of users currently communicating through the device or component, a cost is determined. The cost is proportional to a number of users affected by the diagnostic action in some embodiments. Some embodiments determine which of the diagnostic actions to select using more sophisticated techniques, such as those described below with respect to FIG. 13A and process 1300. Some embodiments determine which of the diagnostic actions to select according to process 1350 and FIG. 13B.

After the diagnostic action is injected in the operation 1020, process 1000 moves to operation 1025, which again monitors operational parameter values after the injection of the action has been performed. Operation 1025 operates in a similar manner as operation 1010 in at least some embodiments.

In operation 1030, the second monitored operational parameter values are provided to a classifier or machine learning model (e.g. 718).

In operation 1035, a class associated with a cause of the underlying problem is obtained. In some embodiments, operation 1035 obtains the class from the machine learning model (e.g. 718). For example, as discussed with respect to FIG. 9, the machine learning model provides one or more possible causes of an underlying problem (e.g. cause identifier 312 from root cause table 310). Associated with each cause is a class identifier field 315. Thus, operation 1035 determines, in some embodiments, a most likely cause of the underlying problem, and a class associated with that most likely cause.

Decision operation 1040 determines whether the probability or confidence of the most likely cause is above a predetermined threshold or otherwise meets a criterion. If the probability or confidence is above a threshold, process 1000 moves to operation 1045, which performs an action associated with the cause. For example, as discussed above with respect to FIG. 3, actions can be associated with a cause via the root cause table 310.

Either after decision operation 1040 or the operation 1045 is performed, process 1000 moves to operation 1050, which sends alerts indicating the identified cause and class of problem identified via operation 1035. In some embodiments, the alerts are sent to addressees associated with the cause. For example, as discussed above with respect to FIG. 3, each cause has associated with it an alert distribution list. In some other embodiments, alerts are sent to addresses associated with a class of problem. For example, if the root cause of the problem has been identified to be a specific software module or a specific hardware module, the system selects the right distribution list and automatically sends notification to the team that can promptly resolve it. This is one example of how operation 1050 obtains addresses to send the alerts. After operation 1050 completes, process 1000 moves to end operation 1055.

Figure 11A:
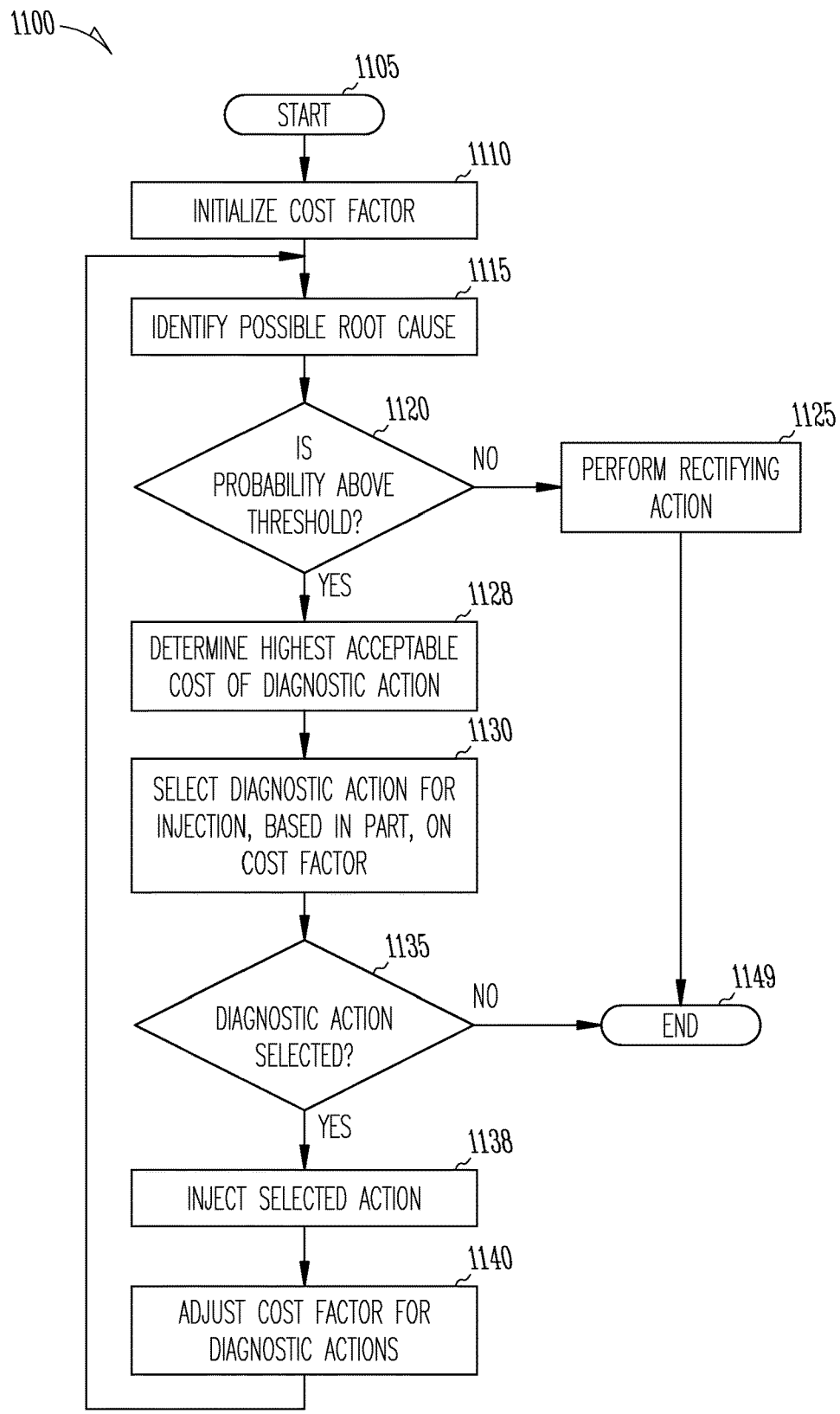
FIG. 11A is a flowchart of an example process for iteratively applying diagnostic actions as needed until either a root cause is sufficiently identified (e.g. probability greater than a threshold) or no diagnostic actions are available for injection.

FIG. 11A is a flowchart of an example process for iteratively applying diagnostic actions as needed until either a root cause is sufficiently identified (e.g. probability greater than a threshold) or no diagnostic actions are available for injection. The example process 1100 is performed in one or more of the disclosed embodiments. In some embodiments, one or more of the functions discussed below are performed by hardware processing circuitry. For example, in some embodiments, instructions (e.g. 1524) stored in an electronic hardware memory (e.g. 1504 and/or 1506) configure the hardware processing circuitry (e.g. 1502) to perform one or more of the functions discussed below. In some embodiments, the network management system 112 performs one or more of the functions discussed below with respect to FIG. 11B.

After start operation 1105, process 1100 moves to operation 1110 which initializes a cost factor to an initial value. In some aspects, the initial value is one (1). The cost factor is used, as described below, to adjust a cost tolerance (generally lower in some embodiments) for diagnostic actions as multiple iterations of applying diagnostic actions are performed.

In operation 1115, a possible root cause of a fault or problem is identified. As discussed above, the possible root cause is identified, in at least some embodiments, based on a machine learning model that analyzes monitored operational parameter values of a system being monitored. Operation 1115 also includes identifying a probability or confidence that the possible root cause is an accurate or correct determination of the cause of a problem. For example, as described above with respect to FIG. 9, in some embodiments, the machine learning model 718 provides one or more root cause indicators 935 that indicate both an individual root cause indicator 940a and an associated probability or confidence indicator 940c. Some embodiments of operation 1115 also identify a rectifying action based on the possible root cause. For example, as discussed above with respect to FIG. 3, some embodiments maintain associations between root causes and rectifying actions. For example, FIG. 3 illustrates such an association via cause table 310, which includes cause identifier field 312 and action identifier field 314). Some embodiments identify a component identifier associated with the possible root cause. For example, as discussed above with respect to FIG. 9, in some embodiments, a machine learning model provides an output indicating a component likely to be contributing to the root cause (e.g. 940b).

Decision operation 1120 determines whether the probability or confidence associated with the root cause is above a predetermined threshold. If the probability is above the predetermined threshold, process 1100 moves from decision operation 1120 to operation 1125, where a rectifying action is performed. The rectifying action is, in some embodiments, associated with the root cause. For example, as discussed above with respect to FIG. 3, some embodiments implement a cause table 310 which associates a root cause with an action (e.g. via cause identifier field 312 and action identifier field 314). Process then ends in operation 1149.

If the probability or confidence is not above the threshold, process 1100 moves from decision operation 1120 to operation 1128 where the operation determines the highest cost of diagnostics action that the process is willing to accept. In some embodiments, this cost is determined based on the cost factor and a probability or confidence indicator 940c provided by the machine learning model along with a root cause. Process 1100 then moves to operation 1130, which selects a diagnostic action based, at least in part, on the cost factor. One embodiment of operation 1130 is discussed below with respect to FIG. 11B and process 1150. Another embodiment of operation 1130 is discussed below with respect to FIG. 13A and process 1300. Some embodiments select a lower cost diagnostic action associated with a component. The component is identified as described above via output from a machine learning model, at least in some embodiments. Another embodiment of operation 1130 is discussed below with respect to FIG. 13B and process 1350

Decision operation 1135 determines if a diagnostic action was selected by operation 1130. For example, operation 1130 is able to select a diagnostic action if it determines that there is a diagnostic action for which the associated cost is smaller than a specific threshold. Similarly, operation 1130 may not be able to select a diagnostic action if it determines that the cost associated with all of the possible diagnostic actions is greater than the said threshold. If not, process 1100 moves from decision operation 1135 to end operation 1149. Otherwise, if an action was selected, process 1100 moves from decision operation 1135 to operation 1138, which injects the selected action. Process 1100 then moves from operation 1138 to operation 1140. In operation 1140, the cost factor is adjusted. As described above, some embodiments iteratively inject diagnostic actions in an attempt to increase a probability that a root cause has been identified. With each iteration, some embodiments decrease a cost tolerance of each subsequently injected action. Decreasing the cost factor in the operation 1140 accomplishes this approach in at least some example embodiments, as will become clear upon review of process 1150 and FIG. 11B, discussed further below. After the cost factor has been decreased in the operation 1140, process 1100 returns to 1115 where the root cause is redetermined, and processing continues.

Figure 11B:
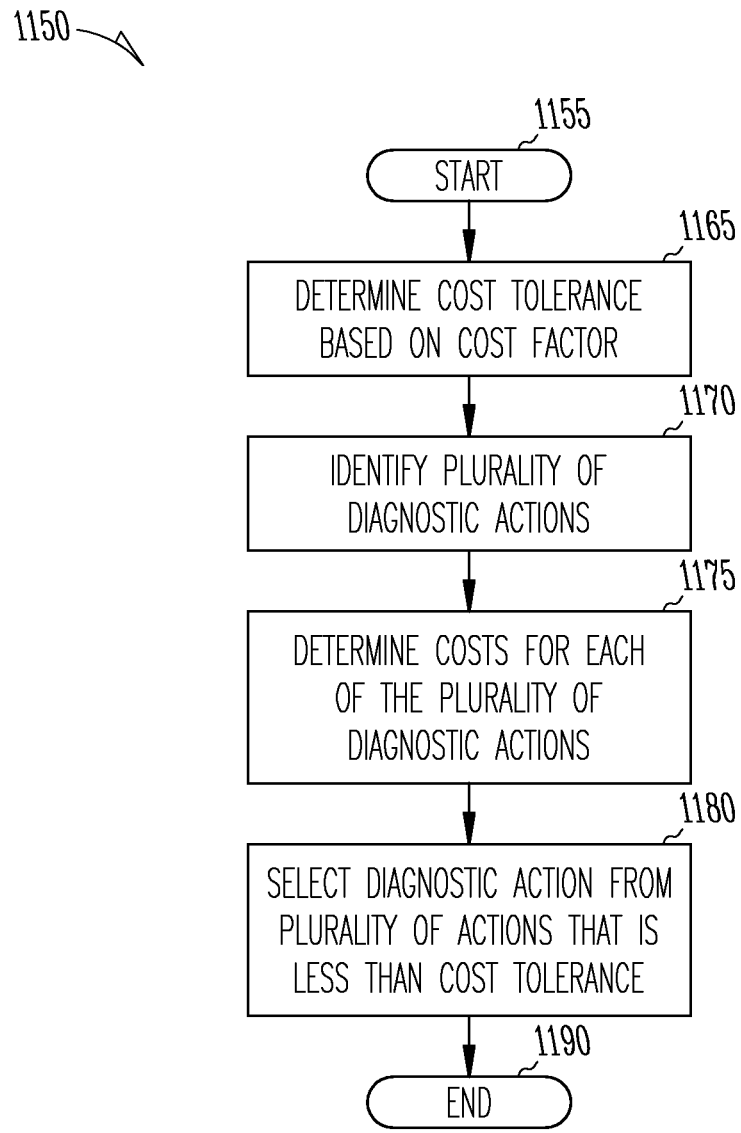
FIG. 11B is a flowchart of an example process for determining which diagnostic action should be performed.

FIG. 11B is a flowchart of an example process for determining which diagnostic action should be performed. Process 1150 of FIG. 11B is performed in one or more of the disclosed embodiments. In some embodiments, one or more of the functions discussed below are performed by hardware processing circuitry. For example, in some embodiments, instructions (e.g. 1524) stored in an electronic hardware memory (e.g. 1504 and/or 1506) configure the hardware processing circuitry (e.g. 1502) to perform one or more of the functions discussed below. In some embodiments, the network management system 112 performs one or more of the functions discussed below with respect to FIG. 11B. Some embodiments of process 1150 are integrated with process 1100, discussed above with respect to FIG. 11A. For example, in some embodiments, process 1150 implements operation 1130 of FIG. 11A. Thus, process 1150 inherits, in these embodiments, one or more parameters, states, and/or variables utilized by process 1100.

After start operation 1155, Process 1150 moves to operation 1165, which sets a cost tolerance based on a cost factor.

The cost factor is inherited from process 1100, at least in some embodiments. Some embodiments implement a function that dynamically determines the cost tolerance based on the probability or confidence indicator 940c that the right root cause has been identified and the cost factor. As one example, if the cost factor is a first value, process 1150 sets the cost tolerance threshold to a first tolerance value, otherwise, process 1150 sets the cost tolerance threshold to a second tolerance value. The first tolerance value is higher than the second tolerance value, at least in some embodiments. The cost factor decreases, in some embodiments, with subsequent iterations. For example, the cost factor has, in some embodiments, an initial value of one (1), with subsequent values decreasing by one tenth (0.1) in some embodiments. The amount the cost factor is reduced for each iteration varies by embodiment. In some embodiments, a cost tolerance for diagnostic actions is inversely proportional to a confidence in a root cause determination (e.g. provided by a machine learning model such as model 718 discussed above with respect to FIGS. 7 and 9).

After operation 1165 completes, process 1150 moves to operation 1170 which identifies a plurality of diagnostic actions. How diagnostic actions are identified may vary by embodiment. As discussed above, in some embodiments, one or more diagnostic actions are first identified based on a component or component type identified by the machine learning model as being associated with a root cause of an underlying issue (e.g. 940b). These embodiments maintain associations between components and/or component types and diagnostic action(s) (e.g. via diagnostic action table 350). When a particular type of component is identified by the machine learning model as being associated with a likely problem, the diagnostic action(s) associated with the component type are considered for injection to the monitored system. The component identifier and/or component type information are inherited from process 1100 in at least some embodiments.

In operation 1175, costs for each of the plurality of diagnostic actions are determined. As discussed above, some embodiments determine action costs dynamically. In some embodiments, an actions cost is based, at least in part, on a number of users affected by performance of the action. Thus, for example, if an action includes restarting a wireless device, a number of users currently communicated via that device is used, in some embodiments, to determine a cost of performing said action.

Operation 1180 selects a diagnostic action from a plurality of diagnostic actions. Operation 1180 ensures that the selected action's cost is less than that indicated by the cost tolerance. Embodiments may vary in how a single diagnostic action is selected in the operation 1180 when multiple diagnostic actions are available. Some embodiments of the operation 1180 rank available candidate diagnostic actions based on their cost. Actions with costs exceeding the cost tolerance are eliminated from the ranking. These embodiments then select a diagnostic action according to the ranking. For example, a first iteration of process 1150 selects a highest ranked (lowest cost) diagnostic action, with subsequent iterations selecting incrementally lower ranked diagnostic actions. Some embodiments may adjust the ranking of possible actions not only based on cost but also based on prior injections of those actions. For example, some embodiments track any improvement in confidence levels of a root cause resulting from injecting of a diagnostic action. The ranking is then based on both the cost and previous relative improvement. Other embodiments may select from a plurality of candidate or possible diagnostic actions using alternative techniques to the example provided here. FIG. 13 provides another example of how diagnostic actions are selected across multiple iterations. After operation 1180 completes, process 1100 moves to end operation 1190.

Figure 12:
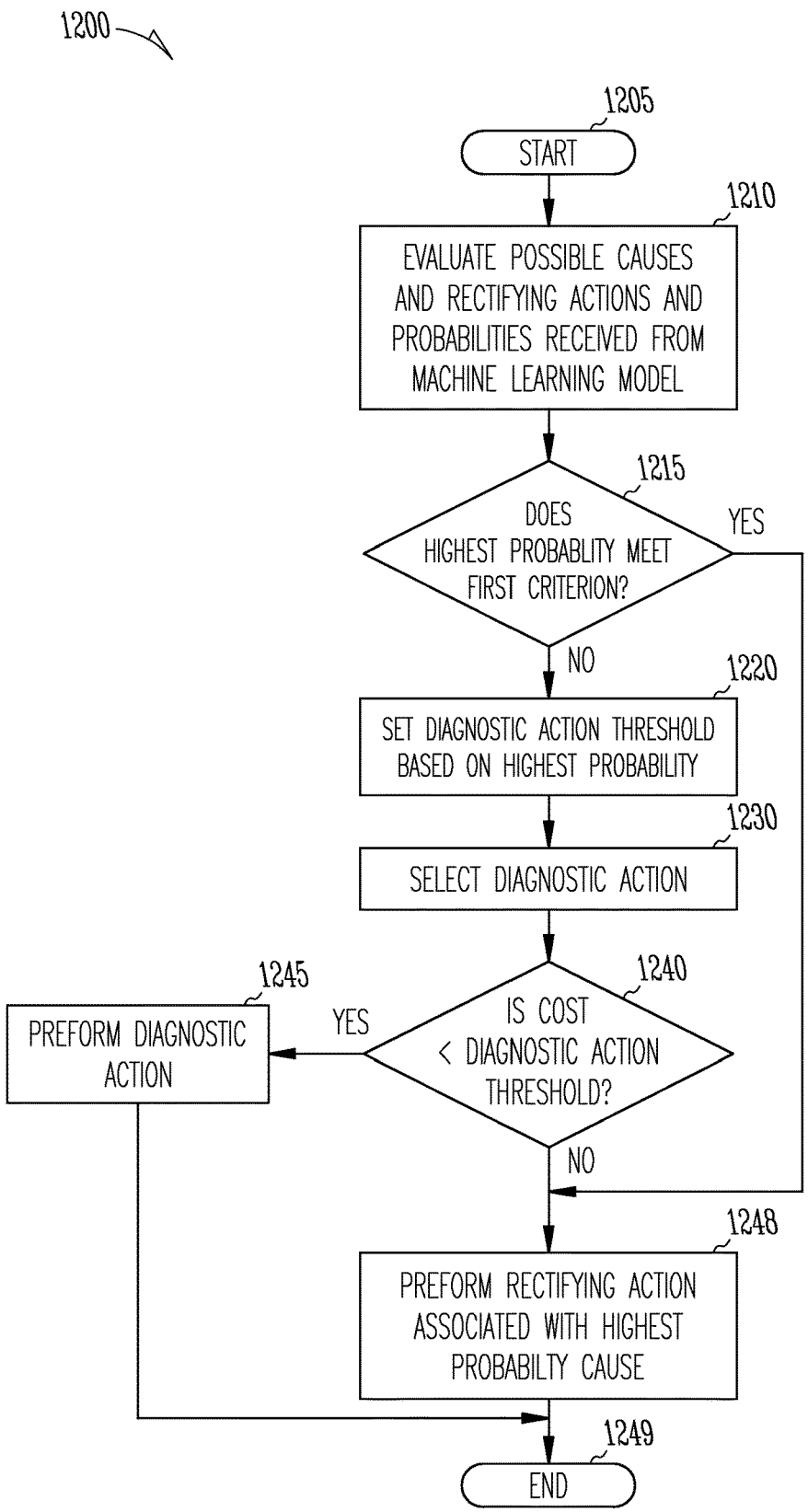
FIG. 12 is a flowchart of an example process for determining whether to perform a rectifying action or a diagnostic action which is performed in one or more of the disclosed embodiments.

FIG. 12 is a flowchart of an example process for determining whether to perform a rectifying action or a diagnostic action which is performed in one or more of the disclosed embodiments. In some embodiments, one or more of the functions discussed below are performed by hardware processing circuitry. For example, in some embodiments, instructions (e.g. 1524) stored in an electronic hardware memory (e.g. 1504 and/or 1506) configure the hardware processing circuitry (e.g. 1502) to perform one or more of the functions discussed below. In some embodiments, the network management system 112 performs one or more of the functions discussed below with respect to FIG. 12.

After start operation 1205, process 1200 moves to operation 1210, which evaluates possible causes and rectifying actions and probabilities received from a machine learning model. For example, in embodiments that utilize a machine learning model that provides one or more possible causes of an underlying problem and probabilities associated with each of those causes (for example, as illustrated above with respect to one or more root cause indicators 935 (includes individual root cause indicator 940a and probability or confidence indicator 940c), operation 1210 compares the probabilities to determine a highest probability cause of an underlying problem.

Decision operation 1215 evaluates whether the highest probability or confidence cause identified in operation 1210 meets a first criterion. In some embodiments, the first criterion evaluates whether a probability or confidence associated with the cause is above a first predetermined threshold. If the first criterion is met (e.g. the probability or confidence is above the first predetermined threshold), process 1200 moves from decision operation 1215 to operation 1248, discussed below. If the first criterion is not met, process 1200 moves from decision operation 1215 to operation 1220.

Operation 1220 sets a diagnostic action tolerance threshold based on the highest probability. In some embodiments, the diagnostic action threshold is set to a first value if the highest probability is within a first range, and a second value if the highest probability falls within a second range. Any number of ranges and values are contemplated by the disclosed embodiments. Thus, decision operation 1215 and operation 1220 describes an example implementation of a threshold for taking diagnostic action that is based, at least in part, on whether a confidence level or probability associated with one or more rectifying actions is above a threshold. Thus, if there is a high confidence solution for rectifying a problem, the need for further diagnostic actions is reduced. By lowering the cost of the tolerance threshold for diagnostic actions, these embodiments inhibit diagnostic actions that are more costly when a relatively high confidence in a solution has already been found.

In operation 1230, a diagnostic action is selected. In some embodiments, diagnostic actions are obtained based on a component associated with the most likely cause identified by operation 1210. For example, as discussed above with respect to FIG. 3, some embodiments associate component types with diagnostic actions (e.g. via diagnostic action table 350). In some cases, multiple diagnostic actions are associated with a component or component type. Various embodiments select a diagnostic action using a variety of techniques. Some embodiments select a lowest cost diagnostic action of the multiple diagnostic actions. Other embodiments determine a score associated with injecting each of the multiple diagnostic actions and select a diagnostic action based on the score. FIG. 13 describes one embodiment of selecting a diagnostic action. FIG. 11B also describes another embodiment of selecting a diagnostic action.

Decision operation 1240 evaluates whether a cost of a diagnostic action selected by operation 1230 is less than the diagnostic action threshold. As discussed above, some embodiments dynamically evaluate or determine costs associated with a diagnostic action based on a number of users to be affected by performance of the diagnostic action. In some embodiments, the number of users is a number of users communicating via the device upon which the diagnostic action is performed.

If the cost of performing the diagnostic action is less than the diagnostic action threshold, process 1200 moves from decision operation 1240 to operation 1245, which performs the diagnostic action. Performing the diagnostic action includes, in at least some embodiments, restarting a specific radio of an AP, restarting a specific module, restarting all of the radios of an AP, powering down an AP, etc., and collecting operational parameters immediately following the injected diagnostics action. In some embodiments, performing the diagnostic action includes notifying addresses included in an alert list associated with the diagnostic action (e.g. via alert list identifier field 316 of the root cause table 310). If the cost of the diagnostic action exceeds the diagnostic action threshold (the perceived benefit of injecting a diagnostics action), process 1200 moves from decision operation 1240 to operation 1248, which performs a rectifying action associated with a highest probability or confidence cause. The highest probability cause was identified in at least the operation 1210 as discussed above. In some embodiments, if a probability that the rectifying action resolves the issue is below a predetermined lower probability threshold, the rectifying action is not performed. Operation 1248 also includes, in some embodiments, generating an alert to one or more messaging addresses associated with the root cause (e.g. via cause table 310). After operation 1245 or operation 1248 completes, process 1200 moves to end operation 1249.

FIG. 12 illustrates a single assessment of a probability that a root cause of an underlying issue has been identified. If the probability that the root cause has been identified is below a specific threshold, the one of multiple actions is invoked to facilitate collection of additional debugging information. Each injected action, e.g., restart of a beacon, restart of a radio, restart of a specific software module, restart of a specific hardware module, restart of an AP, cycling power to an AP, etc., has a cost associated with it. In some embodiments, the rules define that the impact (cost) of injecting an action that the system is willing to accept is inversely proportional to a confidence that a root cause of the underlying issue is already determined.

After an injection of an action to facilitate collection of additional debugging data, this additional debugging data is provided to the machine learning model). Based on the additional debugging data, the machine learning model outputs a new estimation of root causes and their corresponding probabilities. These new probabilities are compared with a threshold and if it is still below a specific threshold, a second new tolerance threshold is determined and used to decide which debugging (data collection) action should be injected into the system. The new action is injected into the system and new data is collected and used as an input to the machine learning model with an attempt to identify an offending component.

In some embodiments, this process continues to iterate until either a specific component is determined to be a root cause of the underlying issue or fault, or until a determination is made that the cost of injecting another action to facilitate additional data collection is too expensive as compared to a benefit of collecting the additional data. In some embodiments, each time a specific action is injected, a tolerance threshold for accepting a cost of an action injection is lowered. As such a number of times a specific action is injected is being limited as the acceptable cost threshold for an action is reduced each time after the specific action is injected.

Figure 13A:
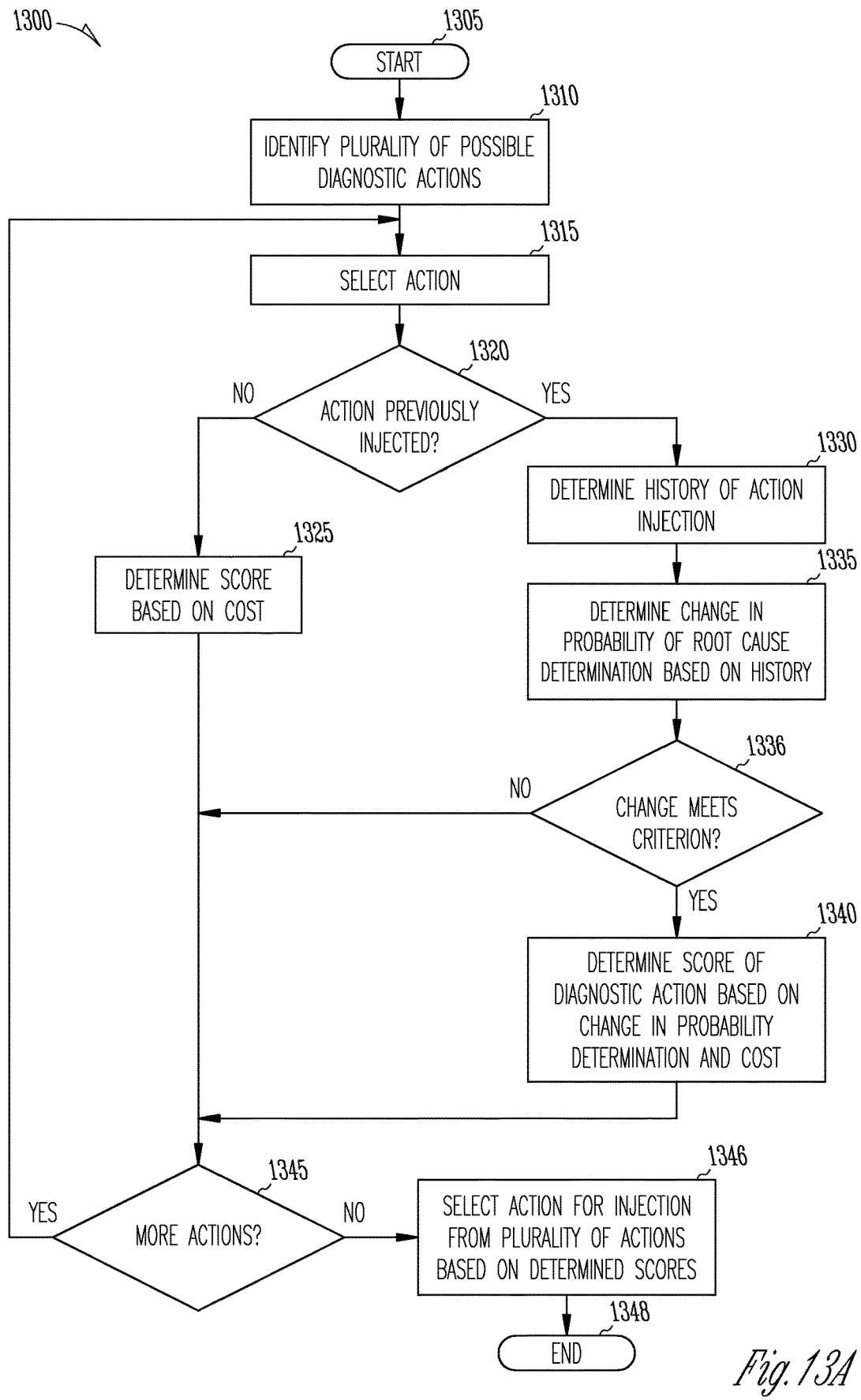
FIG. 13A is a flowchart of an example process for determining whether to inject a diagnostic action.

FIG. 13A is a flowchart of an example process for determining an action to inject based on a cost benefit analysis of injecting the action. Process 1300 of FIG. 13A is performed in one or more of the disclosed embodiments. In some embodiments, one or more of the functions discussed below are performed by hardware processing circuitry. For example, in some embodiments, instructions (e.g. 1524) stored in an electronic hardware memory (e.g. 1504 and/or 1506) configure the hardware processing circuitry (e.g. 1502) to perform one or more of the functions discussed below with respect to FIG. 13A and process 1300. In some embodiments, the network management system 112 performs one or more of the functions discussed below with respect to FIG. 13A and process 1300. Some embodiments of the operation 1130, discussed above with respect to FIG. 11A, include one or more of the functions discussed below with respect to FIG. 13A and process 1300. Some embodiments of operation 1020, discussed above with respect to FIG. 10, implement one or more of the functions discussed below with respect to FIG. 13A and process 1300.

After start operation 1305, process 1300 moves to operation 1310, where a plurality of candidate or possible diagnostic actions are identified. As discussed above, some embodiments identify candidate or possible diagnostic actions via a mapping between a component type and the diagnostic actions (e.g. via diagnostic action table 350, and or component table 370). The component type is obtained, in some embodiments, based on output from a machine learning model indicating a possible root cause of a problem (e.g. component identifier 940b output by machine learning mode 718 identifies a component that is a likely source of a problem).

Operation 1315 selects a single action from the plurality of possible diagnostic actions. Operation 1315 is designed to iteratively select different diagnostic actions from the plurality of diagnostic actions as process 1300 iterates, as described below.

After operation 1315, decision operation 1320 determines whether the selected diagnostic action has been previously injected. In some embodiments, the determination of whether a diagnostic action has been previously injected evaluates whether the action has been previously injected within a predetermined elapsed time of a present time. In some embodiments, the determination of whether the action was previously injected relates to a particular determination of a possible root cause. For example, some embodiments of process 1300 inherit a root cause determination from process 1100, discussed above with respect to FIG. 11A (e.g. as determined by operation 1115). Some embodiments maintain a history of action injections. (e.g. via injection history table 360). These embodiments track a history of injected actions and any improvement in a probability of a root cause determination that occurs after the injection of the action. From this information, process 1300 determines, in some embodiments, a benefit of an injected action. The benefit can be specific to a particular component or component type (e.g. via component id field 366, and/or component table 370).

If the action was not previously injected, process 1300 moves from decision operation 1320 to operation 1325, which determines a cost of the action. For example, as discussed above, some embodiments maintain an association between an action, and a cost of applying the action. (e.g. action table 320 stores a cost function in cost function field 326 for computing an action's cost, which provides for dynamic determination of an action's cost. Dynamic determination of an action's cost is based, in at least some embodiments, on a number of users communicated via the identified component. Operation 1325 then determines a score for the action based on the cost. In some embodiments, the score is inversely proportional to the cost.

If the action was previously injected, process 1300 moves from decision operation 1320 to operation 1330, which determines history of injecting the action. Determining the history can include determining how many times the particular action has been injected previously, and under what particular circumstances it was injected (e.g. to correct a problem in which component, the time of the injection, etc.).

Operation 1335 evaluates any previous change in a probability of a root cause determination based on previous injections of the action. For example, if the action was injected between a first root cause determination and a second root cause determination, operation 1335 determines a difference between a probability associated with the first root cause determination and the second root cause determination. Some embodiments of operation 1335 determine multiple differences in confidence levels or probabilities between multiple pairs of root cause determinations. Some embodiments predict a difference in a probability determination based on prior differences in probability determinations resulting from previous injections of the action. For example, some embodiments examine a history of injections of an action and predict a next probability improvement of injecting the action based on the history of probability differences.

Decision operation 1336 evaluates whether the determined change in probability meets a criterion. In some embodiments, the criterion evaluates whether a rate of improvement in probability or confidence in a root cause determination exceeds a threshold rate. In some embodiments, the criterion evaluates a change in probability or confidence values of injecting the action over time. If the amount of change or rate of change is below a threshold, some embodiments move from decision operation 1336 to decision operation 1345. This causes no score to be generated for the current diagnostic action and the current diagnostic action is effectively removed from consideration. Otherwise, process 1300 moves from decision operation 1336 to operation 1340.

Operation 1340 determines a score of the action based on the determined change in probabilities of operation 1335 and the action's cost. For example, some embodiments of operation 1340 relate a difference or improvement in probabilities between an injection of the action to the actions cost, with larger improvements in probabilities relative to cost providing relatively better scores.

Decision operation 1345 determines whether there are additional actions to evaluate in the plurality of diagnostic actions. If additional diagnostic actions are available for determination of a cost/benefit measurement, process 1300 moves from decision operation 1345 to operation 1315. Operation 1315 selects an additional action and processing continues as described above. Otherwise, if all of the actions of the plurality of actions have been processed, process 1300 moves from decision operation 1345 to operation 1346, which selects an action for injection from the plurality of actions that have scores. The selection is based at least in part on the scores determined by process 1300. For example, in some embodiments, an action having a highest score is selected. After operation 1346 completes, process 1300 moves to end operation 1348.

Figure 13B:
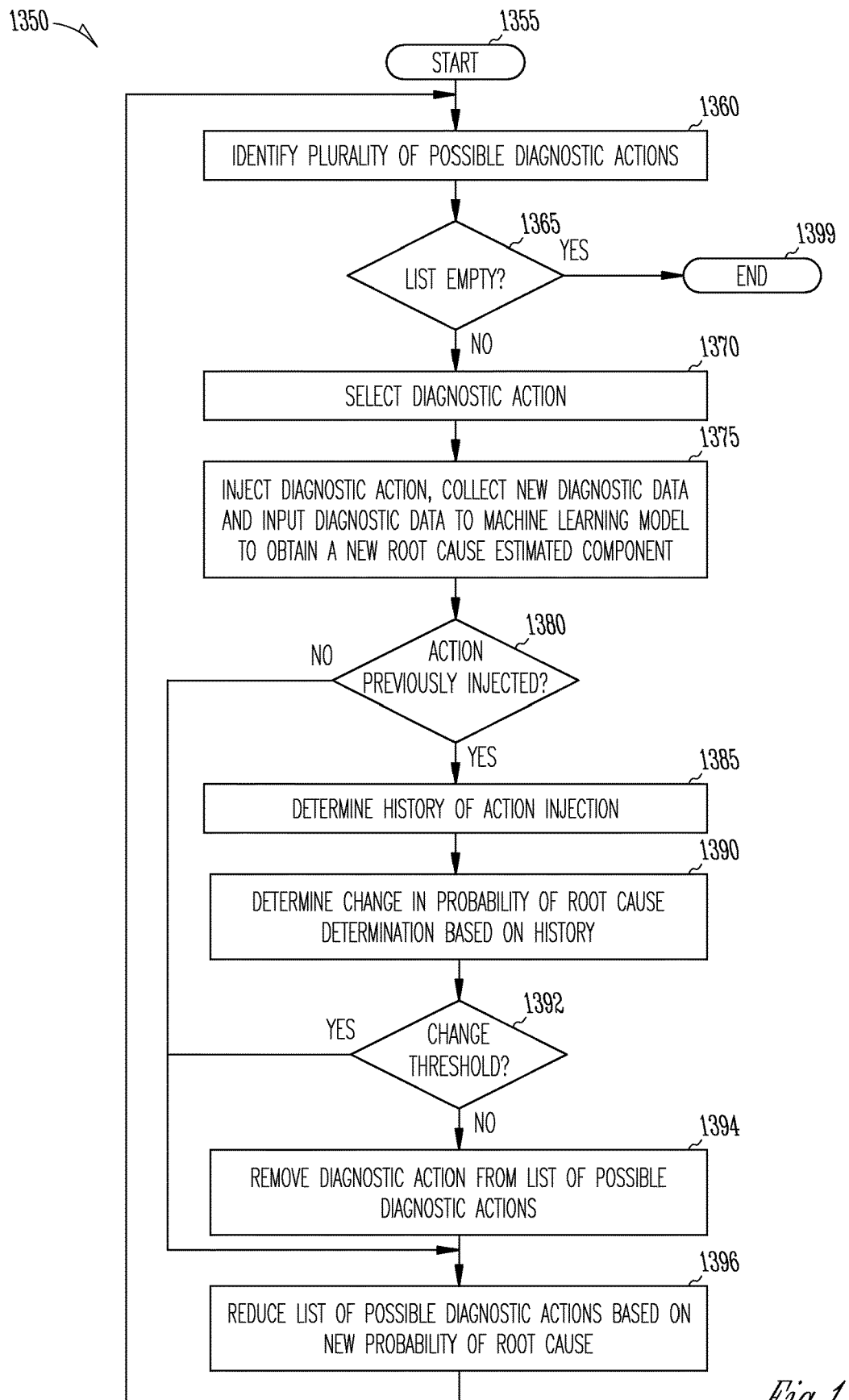
FIG. 13B is a flowchart of an example process for determining whether to inject a diagnostic action.

FIG. 13B is a flowchart of an example process for determining an action to inject based on a cost benefit analysis of injecting the action. Process 1350 of FIG. 13B is performed in one or more of the disclosed embodiments. In some embodiments, one or more of the functions discussed below are performed by hardware processing circuitry. For example, in some embodiments, instructions (e.g. 1524) stored in an electronic hardware memory (e.g. 1504 and/or 1506) configure the hardware processing circuitry (e.g. 1502) to perform one or more of the functions discussed below with respect to FIG. 13B and process 1350. In some embodiments, the network management system 112 performs one or more of the functions discussed below with respect to FIG. 13B and process 1350. Some embodiments of the operation 1130, discussed above with respect to FIG. 11A, include one or more of the functions discussed below with respect to FIG. 13B and process 1350. Some embodiments of operation 1020, discussed above with respect to FIG. 10, implement one or more of the functions discussed below with respect to FIG. 13B and process 1350.

After start operation 1355, process 1350 moves to operation 1360, where a plurality of candidate or possible diagnostic actions are identified. As discussed above, some embodiments identify candidate or possible diagnostic actions via a mapping between a component type and the diagnostic actions (e.g. via diagnostic action table 350, and or component table 370). The component type is obtained, in some embodiments, based on output from a machine learning model indicating a possible root cause of a problem (e.g. component identifier 940b output by machine learning mode 718 identifies a component that is a likely source of a problem).

Decision operation 1365 determines whether there are any diagnostics operations that meet the tolerable cost threshold. If there are no diagnostics actions that meet the criteria, the process ends at operation 1399. However, if decision operation 1365 identifies one or more diagnostics actions that their cost is lower than the tolerable cost threshold, the process 1350 moves to operation 1370 which selects a single action from the plurality of possible diagnostic actions. Operation 1370 is designed to iteratively select different diagnostic actions from the plurality of diagnostic actions as process 1350 iterates, as described below.

After operation 1370, operation 1375 injects or invokes the diagnostics action, and the system collects the resulting operational data and uses it as input for the machine learning process which determines a root cause with a new probability of certainty. As previously described, the new probability certainty is used to determine a new tolerance cost for additional diagnostic actions.

After operation 1375 completes, process 1350 moves to decision operation 1380 which determines whether the selected diagnostic action have been previously used. If this is the first time the diagnostics action has been used, process moves to operation 1396.

Operation 1396 examines the tolerance cost which was derived in operation 1375 and if it finds diagnostics actions with cost higher than the new cost tolerance it removes these actions from the list of plurality of possible diagnostics actions.

After operation 1396 completes, process 1350 loops back to operation 1360.

Returning to the discussion of decision operation 1380, if the same action has been previously invoked process 1350 moves from decision operation 1380 to operation 1385 where the history of the impact of this diagnostic action is examined. More specifically, operation 1390 determines a change between a confidence in the root cause determination that has been achieved by the consecutive invocation of the said diagnostic actions.

Decision operation 1392 determines if the change, or improvement in the determination of the root cause, is greater than a predetermined threshold. If decision operation 1392 determines that the reuse of the said diagnostic action improved the determination of the root cause by more than the threshold, the process 1350 moves to operation 1396 and then returns to operation 1310 as described above. On this path the said diagnostics operation may be attempted again since it shown promise in increasing the probability of identifying the root cause.

However, if operation 1392 determines that reusing the said diagnostics action did not improve the ability of collecting new information that can help the machine learning determine the root cause, the process moves to operation 1394 where the said diagnostic action is removed from the list of possible diagnostics actions.

The process 1350 then moves to operation 1396, the functions of which are described above. After operation 1396 completes, process 1350 returns back to operation 1310 with at least one less diagnostics action in the list of possible diagnostics action.

Figure 14A:
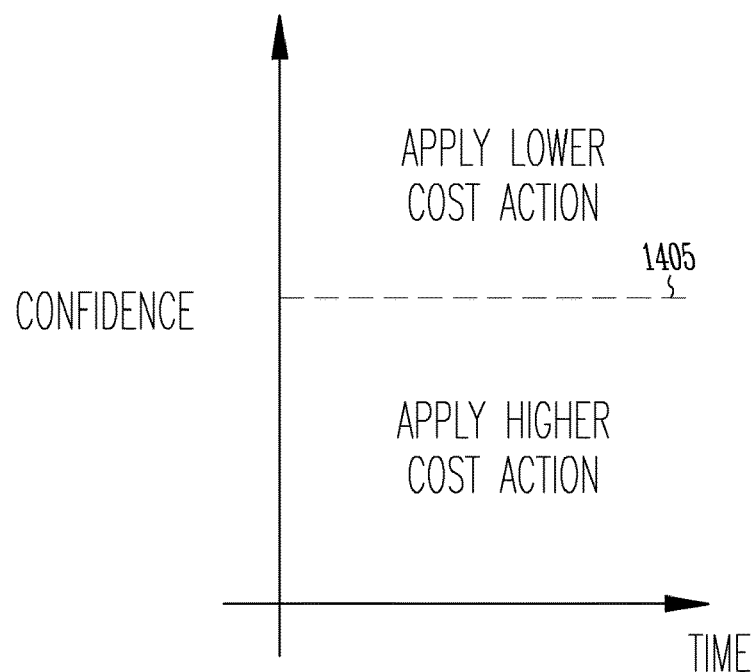
FIG. 14A is a graph showing operation of one or more of the disclosed embodiments.

FIG. 14A is a graph showing operation of one or more of the disclosed embodiments. FIG. 14A illustrates a rule that an action (diagnostics action) having a larger cost than a second diagnostics action can be applied to a system being monitored when a probability or confidence that the identified root cause is causing a problem is below a threshold 1405. Similarly, the embodiment of FIG. 14A operates to apply a predetermined rule in FIG. 14A dictates that the network management can inject an action with higher (escalating) cost when the confidence in the root cause which the ML model produces is below the threshold 1405, and similarly, apply a lower cost action when the confidence or probability that the root cause is causing the identified problem is above a predetermined threshold. Said in other words, in some embodiments, if there is a low confidence that an underlying issue can be automatically resolved, a relatively higher cost diagnostics action can be injected to collect additional diagnostics information. However, when a root cause is determined with a high confidence only relatively lower cost diagnostics actions are permitted to be injected, since there is relatively less need for additional diagnostics information.

Figure 14B:
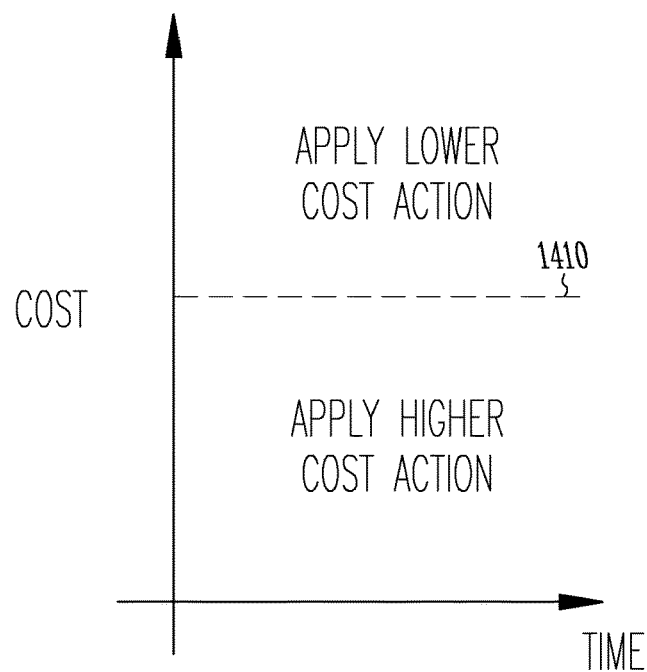
FIG. 14B illustrates an embodiment that applies a more costly action if the cost is smaller than a predetermined threshold, and similarly, apply a less costly action if the cost of the higher cost action is above a predetermined threshold.

FIG. 14B illustrates an example preconfigured rule implemented in some of the disclosed embodiments. The rule of FIG. 14B guides the network management to permit injecting a more costly action into the device if cost associated with the injected action used to determine the root cause is smaller than a predetermined cost tolerance threshold 1410, and similarly, not allowed to inject the next more costly action into the device if the cost of the injected action used for determining the root cause is above a predetermined threshold. As explained above, each time after an action is injected into the system, new current information is obtained and used as an input into the machine learning process. The machine learning produces an output 795 as candidates for being the root cause of the underlying issue as well as the associated probability with each one of these root cause candidates. As a result, the system calculates a new cost threshold for permitting additional actions to be injected into the communication system. Consequently, the predetermined cost tolerance threshold 1410 is dynamically calculated in each iteration.

Figure 14C:
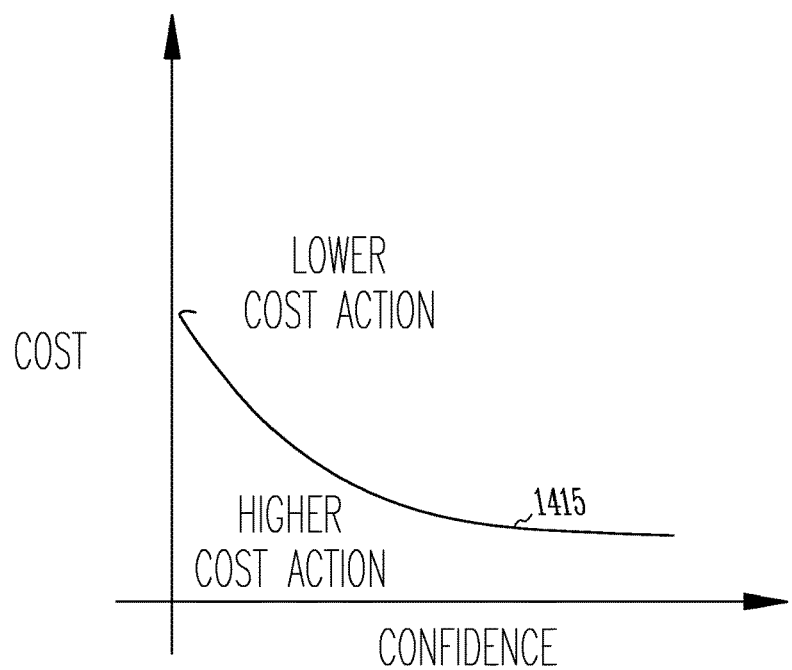
FIG. 14C illustrates an embodiment that determines an action to apply based on a confidence level or probability that a particular root cause is causing a problem in a monitored system.

FIG. 14C illustrates another example preconfigured rule wherein the network management is guided by a curving cost tolerance threshold 1415 which is a function of the confidence of the machine learning model in determining the root cause of the underlying issue. The curving cost tolerance threshold 1415 illustrates that when the confidence that the machine learning has identified the root cause of the underlying issue is lower, the rule permits injecting or invoking diagnostics actions of higher costs e.g., restarting an AP (rather than restarting only a specific radio in an AP. Thus, for example, when a confidence in a rectifying action's ability to resolve a fault or underlying issue is below a threshold, some embodiments determine a relatively higher cost diagnostic action is acceptable for injection or invocation. This contrasts with a relatively lower cost tolerance for injected diagnostic actions when a confidence of a identifying the root cause and invoking rectifying action resolving an issue is relatively higher.

Figure 14D:
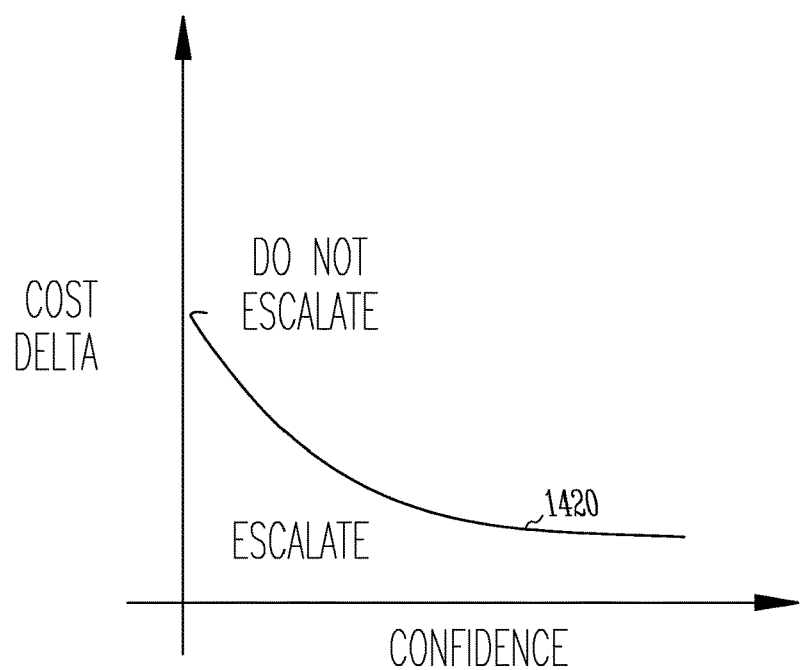
FIG. 14D illustrates an embodiment that selects an action based on a predetermined threshold and its relationship to a confidence level or probability that the root cause is causing the problem identified by a system monitored by the embodiment.

FIG. 14D illustrates another example of a preconfigured rule wherein the network management is guided by a threshold 1420 which is a function of the difference between a confidence of a machine learning model in a determining of a root cause of an underlying issue based on two consecutive invocations of the same action (injection of an action that facilitates collection of additional debugging information). Specifically, as explained in greater details in FIG. 13, when the incremental benefit (cost delta) of repeating injecting (the same) action, collecting current information e.g., information 790, and determining the root cause produces lower cost benefit, some embodiments permits an escalation of a diagnostics action to a more costly diagnostics action. Higher cost actions may have a relatively broader scope of impact than lower cost actions.

Figure 15:
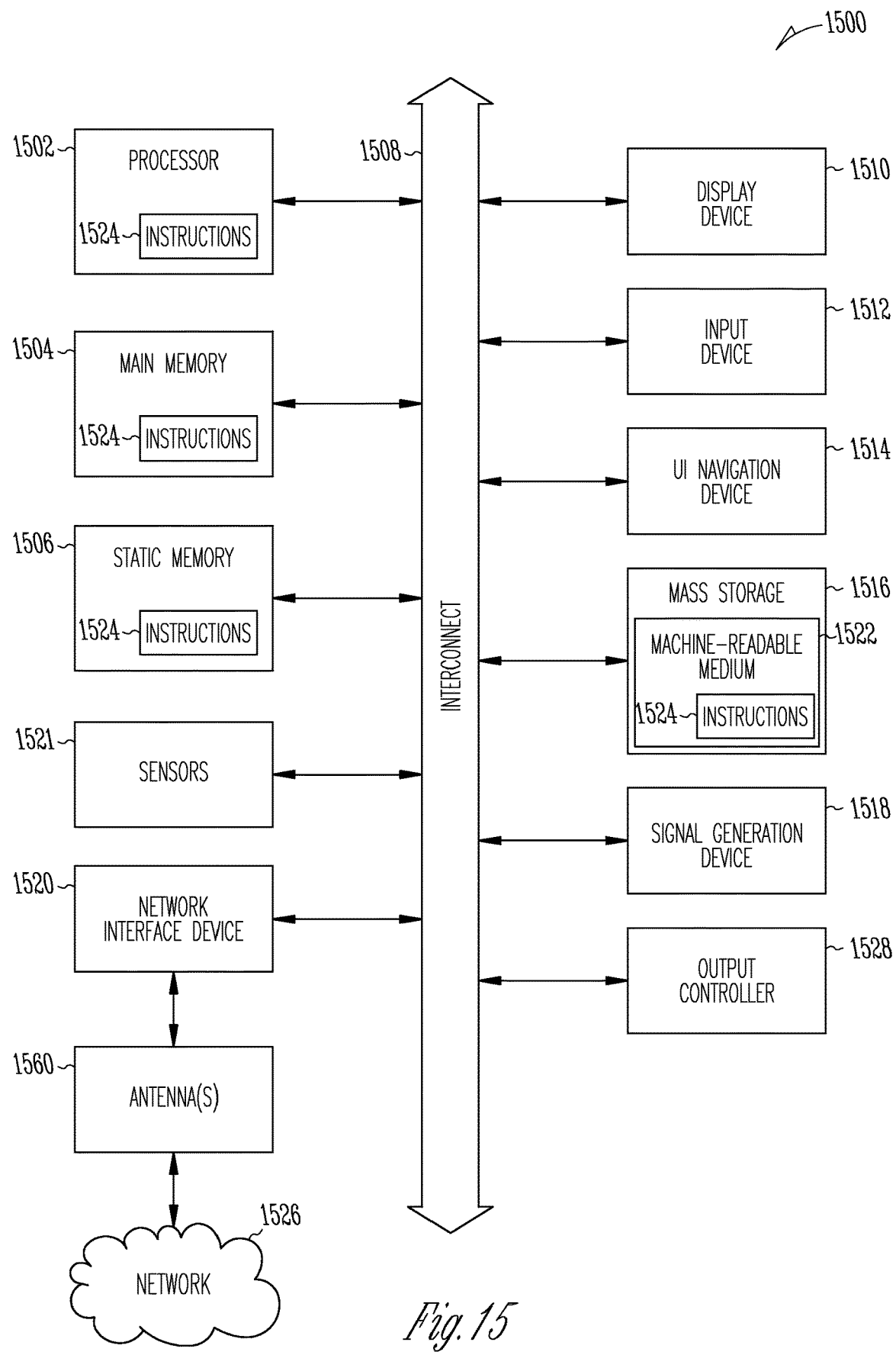
FIG. 15 illustrates a block diagram of an example machine upon which any one or more of the techniques (e.g., methodologies) discussed herein may perform.

FIG. 15 illustrates a block diagram of an example machine 1500 upon which any one or more of the techniques (e.g., methodologies) discussed herein may perform. Machine 1500 (e.g., computer system) may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink 1508 (e.g., bus).

Specific examples of main memory 1504 include Random Access Memory (RAM), and semiconductor memory devices, which may include, in some embodiments, storage locations in semiconductors such as registers. Specific examples of static memory 1506 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1500 may further include a display device 1510, an input device 1512 (e.g., a keyboard), and a user interface (UI) navigation device 1514 (e.g., a mouse). In an example, the display device 1510, input device 1512 and UI navigation device 1514 may be a touch screen display. The machine 1500 may additionally include a mass storage (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 1502 and/or instructions 1524 may comprise processing circuitry and/or transceiver circuitry.

The mass storage 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the mass storage 1516 may constitute machine readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1522 is illustrated as a single medium, the term "machine readable medium" may include a single medium or multiple media (e.g., a centralized or distributed database, and/or associated caches and servers) configured to store instructions 1524.

An apparatus of the machine 1500 may be one or more of a hardware processor 1502 (e.g., a central processing unit (CPU), a graphics processing unit (GPU), a hardware processor core, or any combination thereof), a main memory 1504 and a static memory 1506, one or more sensors 1521, network interface device 1520, one or more antennas 1560, a display device 1510, an input device 1512, a UI navigation device 1514, a mass storage 1516, instructions 1524, a signal generation device 1518, and an output controller 1528. The apparatus may be configured to perform one or more of the methods and/or operations disclosed herein. The apparatus may be intended as a component of the machine 1500 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1520 may include one or more physical jacks (e.g., Ethernet, coaxial, or phone jacks) or one or more antennas to connect to the communications network 1526. In an example, the network interface device 1520 may include one or more antennas 1560 to wirelessly communicate using at least one of single-input multiple-output (SIMO), multiple-input multiple-output (MIMO), or multiple-input single-output (MISO) techniques. In some examples, the network interface device 1520 may wirelessly communicate using Multiple User MIMO techniques. The term "transmission medium" shall be taken to include any intangible medium that is capable of storing, encoding or carrying instructions for execution by the machine 1500, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

While the above-described flowcharts have been discussed in relation to a particular sequence of events, it should be appreciated that changes to this sequence can occur without materially effecting the operation of the embodiment(s). Additionally, the example techniques illustrated herein are not limited to the specifically illustrated embodiments but can also be utilized with the other example embodiments and each described feature is individually and separately claimable.

Those skilled in the art should recognize that while the discussion above focused on measurements of SLE parameters, the terms (key performance indicator) KPI parameters and SLE parameters should be viewed as interchangeable and as such the disclosed embodiments encompass scenarios wherein KPI parameters are used along or instead of SLE parameters.

The above-described system can be implemented on a wireless communications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like. Similarly, the above-described embodiments can be implemented on a wired and/or optical communications device(s)/system, Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-835032 nm Vishera, AMD® Kaveri processors, Texas Instruments® Jacinto C6000™ automotive infotainment processors, Texas Instruments® OMAP™ automotive-grade mobile processors, ARM® $Corte_x$™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications reliability. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

Example 1 is a method, comprising: receiving, from one or more devices of a network system, a time series of operational parameter values; providing the time series of operational parameter values to a machine learning model; receiving, from the machine learning model, an indication of a cause of a fault in operation of the network system; selecting a first action to perform on the network system based on the cause; performing the first action; and notifying the machine learning model of the performed first action.

In Example 2, the subject matter of Example 1 optionally includes receiving, from the network system, a second time series of operational parameter values after performing the action; determining whether the fault is resolved based on the second time series; and conditionally applying a second action to the network system based on whether the fault is resolved.

In Example 3, the subject matter of any one or more of Examples 1-2 optionally include identifying a first distribution list associated with a first class of root cause, and identifying a second distribution list associated with a second class of root cause, and generating alerts based on the first distribution list and second distribution list.

In Example 4, the subject matter of any one or more of Examples 1-3 optionally include wherein the receiving of the time series of operational parameter values comprising receiving, from a plurality of devices included in the network system, a time series of the respective devices operational parameter values, and providing each of the time series to the machine learning model.

In Example 5, the subject matter of any one or more of Examples 1-4 optionally include wherein the operational parameter values indicate one or more of CPU utilization of a network component, memory utilization of a network component, latency at a network component, throughput of a network component, a number of connections maintained by a network component, a packet error count at a network component, or a number of associated wireless terminals at a network component.

In Example 6, the subject matter of any one or more of Examples 1-5 optionally include wherein the operational parameter values indicate one or more of an access point name, service set identifier, channel, band, media access control (MAC) information, or basic service set identifier.

In Example 7, the subject matter of any one or more of Examples 1-6 optionally include receiving, from one or more devices of the network system, information indicating message content exchanged between devices of the network system, and providing the information indicating message content to the machine learning model.

In Example 8, the subject matter of any one or more of Examples 1-7 optionally include wherein the selecting of the first action comprises determining a first cost of the first action and a second cost of a second action associated with the cause, and selecting either the first action or the second action based on the first and second cost.

In Example 9, the subject matter of Example 8 optionally includes wherein the first action or the second action is one of resetting a device included in the network system, generating a status request to a component of the network system, resetting a hardware component of a device included in the network system, resetting a software or firmware component of a device included in the network system, or requesting a component of the network system perform a task.

In Example 10, the subject matter of any one or more of Examples 1-9 optionally include first evaluating a confidence that the selected action will resolve the fault; setting a diagnostic action cost threshold based on the first evaluating; second evaluating a diagnostic action based on the diagnostic action cost threshold; and conditionally performing the diagnostic action based on the second evaluating.

In Example 11, the subject matter of Example 10 optionally includes setting the diagnostic action cost threshold to a first value if the confidence is above a predetermined threshold and a second value otherwise, where the first value is lower than the second value.

In Example 12, the subject matter of any one or more of Examples 10-11 optionally include injecting a first diagnostic action having a first cost instead of a second diagnostic action having a second cost, the second cost lower than the first cause, the injecting in response to the confidence being lower than a escalation threshold.

In Example 13, the subject matter of any one or more of Examples 10-12 optionally include first injecting a first diagnostic action, the first diagnostic action having a first cost; monitoring operational parameter values after the injection of the first diagnostic action; determining a first root cause and associated first probability based on the monitored operational parameters; second injecting the first diagnostic action based on a determination that the first probability is below a predetermined threshold; second monitoring operational parameter values after the second injecting of the first diagnostic action; determining a second probability associated with the first root cause; adjusting a diagnostic cost threshold based on the first and second probabilities; and determining whether to inject an additional diagnostic action based on the adjusted diagnostic cost threshold.

In Example 14, the subject matter of Example 13 optionally includes determining a difference between the first probability and the second probability, wherein the determining of whether to inject the additional diagnostic action is based on the difference.

Example 15 is a non-transitory computer readable storage medium comprising instructions that when executed configure hardware processing circuitry to perform operations comprising: receiving, from one or more devices of a network system, a time series of operational parameter values; providing the time series of operational parameter values to a machine learning model; receiving, from the machine learning model, an indication of a cause of a fault in operation of the network system; selecting a first action to perform on the network system based on the cause; performing the first action; and notifying the machine learning model of the performed first action.

In Example 16, the subject matter of Example 15 optionally includes receiving, from the network system, a second time series of operational parameter values after performing the action; determining whether the fault is resolved based on the second time series; and conditionally applying a second action to the network system based on whether the fault is resolved.

In Example 17, the subject matter of any one or more of Examples 15-16 optionally include identifying a first distribution list associated with a first class of root cause, and identifying a second distribution list associated with a second class of root cause, and generating alerts based on the first distribution list and second distribution list.

In Example 18, the subject matter of any one or more of Examples 15-17 optionally include wherein the receiving of the time series of operational parameter values comprising receiving, from a plurality of devices included in the network system, a time series of the respective devices operational parameter values, and providing each of the time series to the machine learning model.

In Example 19, the subject matter of any one or more of Examples 15-18 optionally include wherein the operational parameter values indicate one or more of CPU utilization of a network component, memory utilization of a network component, latency at a network component, throughput of a network component, a number of connections maintained by a network component, a packet error count at a network component, or a number of associated wireless terminals at a network component.

In Example 20, the subject matter of any one or more of Examples 15-19 optionally include wherein the operational parameter values indicate one or more of an access point name, service set identifier, channel, band, media access control (MAC) information, or basic service set identifier.

In Example 21, the subject matter of any one or more of Examples 15-20 optionally include receiving, from one or more devices of the network system, information indicating message content exchanged between devices of the network system, and providing the information indicating message content to the machine learning model.

In Example 22, the subject matter of any one or more of Examples 15-21 optionally include wherein the selecting of the first action comprises determining a first cost of the first action and a second cost of a second action associated with the cause, and selecting either the first action or the second action based on the first and second cost.

In Example 23, the subject matter of Example 22 optionally includes wherein the first action or the second action is one of resetting a device included in the network system, generating a status request to a component of the network system, resetting a hardware component of a device included in the network system, resetting a software or firmware component of a device included in the network system, or requesting a component of the network system perform a task.

In Example 24, the subject matter of any one or more of Examples 15-23 optionally include first evaluating a confidence that the selected action will resolve the fault; setting a diagnostic action cost threshold based on the first evaluating; second evaluating a diagnostic action based on the diagnostic action cost threshold; and conditionally performing the diagnostic action based on the second evaluating.

In Example 25, the subject matter of Example 24 optionally includes setting the diagnostic action cost threshold to a first value if the confidence is above a predetermined threshold and a second value otherwise, where the first value is lower than the second value.

In Example 26, the subject matter of any one or more of Examples 24-25 optionally include injecting a first diagnostic action having a first cost instead of a second diagnostic action having a second cost, the second cost lower than the first cause, the injecting in response to the confidence being lower than a escalation threshold.

In Example 27, the subject matter of any one or more of Examples 24-26 optionally include first injecting a first diagnostic action, the first diagnostic action having a first cost; monitoring operational parameter values after the injection of the first diagnostic action; determining a first root cause and associated first probability based on the monitored operational parameters; second injecting the first diagnostic action based on a determination that the first probability is below a predetermined threshold; second monitoring operational parameter values after the second injecting of the first diagnostic action; determining a second probability associated with the first root cause; adjusting a diagnostic cost threshold based on the first and second probabilities; and determining whether to inject an additional diagnostic action based on the adjusted diagnostic cost threshold.

In Example 28, the subject matter of Example 27 optionally includes determining a difference between the first probability and the second probability, wherein the determining of whether to inject the additional diagnostic action is based on the difference.

Example 29 is a system, comprising: hardware processing circuitry; one or more hardware memories storing instructions that when executed configure the hardware processing circuitry to perform operations comprising: receiving, from one or more devices of a network system, a time series of operational parameter values; providing the time series of operational parameter values to a machine learning model; receiving, from the machine learning model, an indication of a cause of a fault in operation of the network system; selecting a first action to perform on the network system based on the cause; performing the first action; and notifying the machine learning model of the performed first action.

In Example 30, the subject matter of Example 29 optionally includes the operations further comprising: receiving, from the network system, a second time series of operational parameter values after performing the action; determining whether the fault is resolved based on the second time series; and conditionally applying a second action to the network system based on whether the fault is resolved.

In Example 31, the subject matter of any one or more of Examples 29-30 optionally include the operations further comprising identifying a first distribution list associated with a first class of root cause, and identifying a second distribution list associated with a second class of root cause, and generating alerts based on the first distribution list and second distribution list.

In Example 32, the subject matter of any one or more of Examples 29-31 optionally include wherein the receiving of the time series of operational parameter values comprising receiving, from a plurality of devices included in the network system, a time series of the respective devices operational parameter values, and providing each of the time series to the machine learning model.

In Example 33, the subject matter of any one or more of Examples 29-32 optionally include wherein the operational parameter values indicate one or more of CPU utilization of a network component, memory utilization of a network component, latency at a network component, throughput of a network component, a number of connections maintained by a network component, a packet error count at a network component, or a number of associated wireless terminals at a network component.

In Example 34, the subject matter of any one or more of Examples 29-33 optionally include wherein the operational parameter values indicate one or more of an access point name, service set identifier, channel, band, media access control (MAC) information, or basic service set identifier.

In Example 35, the subject matter of any one or more of Examples 29-34 optionally include the operations further comprising receiving, from one or more devices of the network system, information indicating message content exchanged between devices of the network system, and providing the information indicating message content to the machine learning model.

In Example 36, the subject matter of any one or more of Examples 29-35 optionally include wherein the selecting of the first action comprises determining a first cost of the first action and a second cost of a second action associated with the cause, and selecting either the first action or the second action based on the first and second cost.

In Example 37, the subject matter of Example 36 optionally includes wherein the first action or the second action is one of resetting a device included in the network system, generating a status request to a component of the network system, resetting a hardware component of a device included in the network system, resetting a software or firmware component of a device included in the network system, or requesting a component of the network system perform a task.

In Example 38, the subject matter of any one or more of Examples 29-37 optionally include the operations further comprising: first evaluating a confidence that the selected action will resolve the fault; setting a diagnostic action cost threshold based on the first evaluating; second evaluating a diagnostic action based on the diagnostic action cost threshold; and conditionally performing the diagnostic action based on the second evaluating.

In Example 39, the subject matter of Example 38 optionally includes the operations further comprising setting the diagnostic action cost threshold to a first value if the confidence is above a predetermined threshold and a second value otherwise, where the first value is lower than the second value.

In Example 40, the subject matter of any one or more of Examples 38-39 optionally include the operations further comprising injecting a first diagnostic action having a first cost instead of a second diagnostic action having a second cost, the second cost lower than the first cause, the injecting in response to the confidence being lower than an escalation threshold.

In Example 41, the subject matter of any one or more of Examples 38-40 optionally include the operations further comprising: first injecting a first diagnostic action, the first diagnostic action having a first cost; monitoring operational parameter values after the injection of the first diagnostic action; determining a first root cause and associated first probability based on the monitored operational parameters; second injecting the first diagnostic action based on a determination that the first probability is below a predetermined threshold; second monitoring operational parameter values after the second injecting of the first diagnostic action; determining a second probability associated with the first root cause; adjusting a diagnostic cost threshold based on the first and second probabilities; and determining whether to inject an additional diagnostic action based on the adjusted diagnostic cost threshold.

In Example 42, the subject matter of Example 41 optionally includes the operations further comprising determining a difference between the first probability and the second probability, wherein the determining of whether to inject the additional diagnostic action is based on the difference.

The invention claimed is:

1. A method, comprising:
receiving, from one or more devices of a network system, a time series of operational parameter values;
providing the time series of operational parameter values to a machine learning model;
receiving, from the machine learning model, an indication of a cause of a fault in operation of the network system;
selecting a first rectifying action to perform on the network system based on the cause;
evaluating a confidence that the selected first rectifying action will resolve the fault;
in response to determining that the confidence does not satisfy a first threshold, selecting a diagnostic action;
in response to determining a cost of performing the diagnostic action does not satisfy a diagnostic action cost threshold, invoking the first rectifying action;
in response to determining a first cost of performing a first diagnostic action satisfies the diagnostic action cost threshold, first injecting the first diagnostic action;
monitoring operational parameter values after the first injecting of the first diagnostic action;
determining a first root cause and associated first probability that the first root cause is the cause of the fault based on the monitored operational parameters;
second injecting the first diagnostic action based on a determination that the first probability is below a predetermined threshold;
monitoring operational parameter values after the second injecting of the first diagnostic action;
determining a second probability that the first root cause is the cause of the fault associated with the first root cause;
adjusting the diagnostic cost threshold based on the first and second probabilities; and
determining whether to inject an additional diagnostic action based on the adjusted diagnostic cost threshold.

2. The method of claim 1, further comprising:
receiving, from the network system, a second time series of operational parameter values after performing the first rectifying action;
determining whether the fault is resolved based on the second time series; and
conditionally applying a second rectifying action to the network system based on whether the fault is resolved.

3. A non-transitory computer readable storage medium comprising instructions that when executed configure hardware processing circuitry to perform operations comprising:
receiving, from one or more devices of a network system, a time series of operational parameter values;
providing the time series of operational parameter values to a machine learning model;
receiving, from the machine learning model, an indication of a cause of a fault in operation of the network system;
selecting a first rectifying action to perform on the network system based on the cause;
evaluating a confidence that the selected first rectifying action will resolve the fault;
in response to determining that the confidence does not satisfy a first threshold, selecting a diagnostic action;
in response to determining a cost of performing the diagnostic action does not satisfy a diagnostic action cost threshold, invoking the first rectifying action;
in response to determining a first cost of performing a first diagnostic action satisfies the diagnostic action cost threshold, first injecting the first diagnostic action;
monitoring operational parameter values after the first injecting of the first diagnostic action;
determining a first root cause and associated first probability that the first root cause is the cause of the fault based on the monitored operational parameters;
second injecting the first diagnostic action based on a determination that the first probability is below a predetermined threshold;
monitoring operational parameter values after the second injecting of the first diagnostic action;
determining a second probability that the first root cause is the cause of the fault associated with the first root cause;
adjusting the diagnostic cost threshold based on the first and second probabilities; and
determining whether to inject an additional diagnostic action based on the adjusted diagnostic cost threshold.

4. The non-transitory computer readable storage medium of claim 3, wherein the selecting of the first rectifying action comprises determining a first cost of the first rectifying action and a second cost of a second rectifying action associated with the cause, and selecting either the first rectifying action or the second rectifying action based on the first and second cost.

5. The non-transitory computer readable storage medium of claim 4, wherein the first rectifying action or the second rectifying action is one of resetting a device included in the network system, generating a status request to a component of the network system, resetting a hardware component of a device included in the network system, resetting a software or firmware component of a device included in the network system, or requesting a component of the network system perform a task.

6. A system, comprising:
hardware processing circuitry;
one or more hardware memories storing instructions that when executed configure the hardware processing circuitry to perform operations comprising:
receiving, from one or more devices of a network system, a time series of operational parameter values;
providing the time series of operational parameter values to a machine learning model;
receiving, from the machine learning model, an indication of a cause of a fault in operation of the network system;
selecting a first rectifying action to perform on the network system based on the cause;

evaluating a confidence that the selected first rectifying action will resolve the fault;
in response to determining that the confidence does not satisfy a first threshold, selecting a diagnostic action;
in response to determining a cost of performing the diagnostic action does not satisfy a diagnostic action cost threshold, invoking the first rectifying action;
in response to determining a first cost of performing a first diagnostic action satisfies the diagnostic action cost threshold, first injecting the first diagnostic action;
monitoring operational parameter values after the first injecting of the first diagnostic action;
determining a first root cause and associated first probability that the first root cause is the cause of the fault based on the monitored operational parameters;
second injecting the first diagnostic action based on a determination that the first probability is below a predetermined threshold;
monitoring operational parameter values after the second injecting of the first diagnostic action;
determining a second probability that the first root cause is the cause of the fault associated with the first root cause;
adjusting the diagnostic cost threshold based on the first and second probabilities; and
determining whether to inject an additional diagnostic action based on the adjusted diagnostic cost threshold.

7. The system of claim 6, the operations further comprising:
receiving, from the network system, a second time series of operational parameter values after performing the first rectifying action;
determining whether the fault is resolved based on the second time series; and
conditionally applying a second rectifying action to the network system based on whether the fault is resolved.

8. The system of claim 6, the operations further comprising identifying a first distribution list associated with a first class of root cause, and identifying a second distribution list associated with a second class of root cause, and generating alerts based on the first distribution list and second distribution list.

9. The system of claim 6, wherein the receiving of the time series of operational parameter values comprising receiving, from a plurality of devices included in the network system, a time series of the respective devices operational parameter values, and providing each of the time series to the machine learning model.

10. The system of claim 6, wherein the operational parameter values indicate one or more of CPU utilization of a network component, memory utilization of a network component, latency at a network component, throughput of a network component, a number of connections maintained by a network component, a packet error count at a network component, or a number of associated wireless terminals at a network component.

11. The system of claim 6, wherein the operational parameter values indicate one or more of an access point name, service set identifier, channel, band, media access control (MAC) information, or basic service set identifier.

12. The system of claim 6, the operations further comprising receiving, from one or more devices of the network system, information indicating message content exchanged between devices of the network system, and providing the information indicating message content to the machine learning model.

13. The system of claim 6, wherein the selecting of the first rectifying action comprises determining a first cost of the first rectifying action and a second cost of a second rectifying action associated with the cause, and selecting either the first rectifying action or the second rectifying action based on the first and second cost.

14. The system of claim 13, wherein the first rectifying action or the second rectifying action is one of resetting a device included in the network system, generating a status request to a component of the network system, resetting a hardware component of a device included in the network system, resetting a software or firmware component of a device included in the network system, or requesting a component of the network system perform a task.

15. The system of claim 6, the operations further comprising setting the diagnostic action cost threshold to a first value if the confidence is above a predetermined threshold and a second value otherwise, where the first value is lower than the second value.

16. The system of claim 6, the operations further comprising injecting a first diagnostic action having a first cost instead of a second diagnostic action having a second cost, the second cost lower than the first cause, the injecting in response to the confidence being lower than an escalation threshold.

17. The system of claim 6, the operations further comprising determining a difference between the first probability and the second probability, wherein the determining of whether to inject the additional diagnostic action is based on the difference.

18. The system of claim 6, the operations further comprising notifying the machine learning model of the invoked first rectifying action.

19. The system of claim 6, wherein the cause of the fault in operation of the network system is a first cause of the fault in operation of the network system, the operations further comprising:
in response to determining that the cost of performing the diagnostic action satisfies the diagnostic action cost threshold, injecting the diagnostic action;
providing additional debugging data collected during performance of the diagnostic action to the machine learning model; and
receiving, from the machine learning model, an indication of a second cause of the fault in operation of the network system.

20. The system of claim 6, the operations further comprising:
in response to determining that the cost of performing the diagnostic action satisfies the diagnostic action cost threshold, invoking the diagnostic action, wherein the diagnostic action includes at least one of restarting a specific radio of at least one access point (AP), restarting a specific module, restarting all of the radios of at least one AP, powering down at least one AP, and collecting operational parameters immediately following performance of the diagnostic action.

* * * * *